United States Patent
Keronen et al.

(10) Patent No.: US 6,871,782 B2
(45) Date of Patent: Mar. 29, 2005

(54) USER PROGRAMMABLE SMART CARD INTERFACE SYSTEM HAVING AN ARBITRARY MAPPING

(75) Inventors: Seppo Reino Keronen, Eastwood (AU); Sue-Ken Yap, Lane Cove (AU); Philip Keith Robertson, Middle Cove (AU)

(73) Assignee: Canon Kabushiki Kaisha, Tokyo (JP)

(*) Notice: Subject to any disclaimer, the term of this patent is extended or adjusted under 35 U.S.C. 154(b) by 122 days.

(21) Appl. No.: 09/801,688

(22) Filed: Mar. 9, 2001

(65) Prior Publication Data

US 2001/0054647 A1 Dec. 27, 2001

Related U.S. Application Data

(63) Continuation-in-part of application No. 09/414,558, filed on Oct. 8, 1999.

(51) Int. Cl.[7] .................................................. G06K 5/00
(52) U.S. Cl. ...................... 235/380; 235/492; 345/172; 345/173; 345/838
(58) Field of Search ................................. 345/156, 172, 345/173, 835, 838, 639, 840; 235/380, 487, 492; 902/25, 26, 41; 705/17, 25, 41; 348/473; 396/312; 707/102; 386/130; 434/317; 715/531; 455/556

(56) References Cited

U.S. PATENT DOCUMENTS 4,977,310 A  12/1990  Studer et al. ................ 235/375
5,002,062 A   3/1991  Suzuki ......................... 128/696
5,015,830 A   5/1991  Masuzawa et al. .......... 235/441
5,331,555 A * 7/1994  Hashimoto et al. ......... 715/531
5,353,016 A  10/1994  Kurita et al. ................ 340/825
5,412,416 A   5/1995  Nemirofsky ................. 348/10
5,430,496 A   7/1995  Silverbrook ................ 348/589

(Continued)

FOREIGN PATENT DOCUMENTS

| DE | 3637684 | 5/1987 |
|----|---------|--------|
| EP | 400221  | 12/1990 |
| EP | 606287  | 7/1994 |
| EP | 816 989 | 1/1998 |

(Continued)

OTHER PUBLICATIONS

"IntelliK ys, Effectiv , Powerful, and Affordabl ," product informati n, http://www.intellitools.c m/intellik ys–text.html, no date available.

Primary Examiner—Jared J. Fureman
(74) Attorney, Agent, or Firm—Fitzpatrick, Cella, Harper & Scinto

(57) ABSTRACT

A customizable user interface system is disclosed, the system comprising: a card (10) comprising a substrate (12), a memory device (19) associated therewith, and indicia (70, 72) formed on said substrate (12) and user interpretable to relate to functions stored within said memory (19); and a reader device (1) for said card (10), the reader (1) comprising a touch sensitive device (8) arranged to overlay said card (10), and through which said indicia (70, 72) are visible, characterized in that said touch sensitive device (8) comprises a membrane via which said indicia (70, 72), arbitrarily arranged on said substrate (12), may be selected.

37 Claims, 27 Drawing Sheets

U.S. PATENT DOCUMENTS

| | | | | |
|---|---|---|---|---|
| 5,434,395 | A | | 7/1995 | Storck et al. ............... 235/380 |
| 5,461,222 | A | * | 10/1995 | Haneda ..................... 235/492 |
| 5,479,205 | A | | 12/1995 | Silverbrook ................ 348/239 |
| 5,572,573 | A | * | 11/1996 | Sylvan et al. ............... 455/556 |
| 5,583,539 | A | | 12/1996 | Hiketa et al. ................. 348/10 |
| 5,594,493 | A | | 1/1997 | Nemirofsky ................ 348/13 |
| 5,601,489 | A | | 2/1997 | Komaki ...................... 463/44 |
| 5,761,485 | A | * | 6/1998 | Munyan ..................... 345/839 |
| 5,845,160 | A | | 12/1998 | Patton ....................... 396/312 |
| 5,878,292 | A | | 3/1999 | Bell et al. ................... 396/312 |
| 5,914,707 | A | | 6/1999 | Kono ......................... 345/173 |
| 5,949,492 | A | * | 9/1999 | Mankovitz ................. 348/473 |
| 5,973,475 | A | | 10/1999 | Combaluzier .............. 320/107 |
| 6,014,593 | A | | 1/2000 | Grufman .................... 700/136 |
| 6,032,857 | A | * | 3/2000 | Kitagawa et al. ........... 235/379 |
| 6,072,980 | A | | 6/2000 | Manico et al. .............. 434/317 |
| 6,223,348 | B1 | | 4/2001 | Hayes et al. ................ 725/152 |
| 6,229,694 | B1 | | 5/2001 | Kono ......................... 361/683 |
| 6,249,644 | B1 | * | 6/2001 | Inoue et al. ................. 386/130 |
| 6,308,202 | B1 | | 10/2001 | Cohn et al. ................. 709/217 |
| 6,408,301 | B1 | | 6/2002 | Patton et al. ............... 707/102 |
| 6,628,509 | B2 | | 9/2003 | Kono ......................... 361/681 |
| 6,686,908 | B1 | * | 2/2004 | Kobayashi ................. 345/173 |
| 6,738,047 | B2 | * | 5/2004 | Kobayashi ................. 345/172 |
| 6,760,014 | B1 | * | 7/2004 | Liberman ................... 235/380 |
| 2001/0017616 | A1 | | 8/2001 | Kabayashi ................. 345/173 |
| 2002/0158849 | A1 | * | 10/2002 | Severson .................... 345/173 |
| 2004/0075642 | A1 | * | 4/2004 | Kisliakov ................... 345/156 |

FOREIGN PATENT DOCUMENTS

| | | |
|---|---|---|
| EP | 827 733 | 3/1998 |
| EP | 1039772 | 9/2000 |
| FR | 2 618 003 | 1/1989 |
| FR | 2696888 | 4/1994 |
| FR | 2721730 | 12/1995 |
| JP | 123986 | 7/1984 |
| JP | 59-123986 | 7/1984 |
| JP | 4-88547 A * | 3/1992 |
| JP | 8-68541 A * | 3/1996 |
| JP | 8-129236 | 5/1996 |
| JP | 8-294080 | 11/1996 |
| WO | WO 93/07715 | 4/1993 |
| WO | WO 95/35534 A1 * | 12/1995 |
| WO | WO 96/32702 | 10/1996 |
| WO | 9520294 | 1/1997 |
| WO | 97/05568 | 2/1997 |
| WO | 98/40863 | 9/1998 |

* cited by examiner

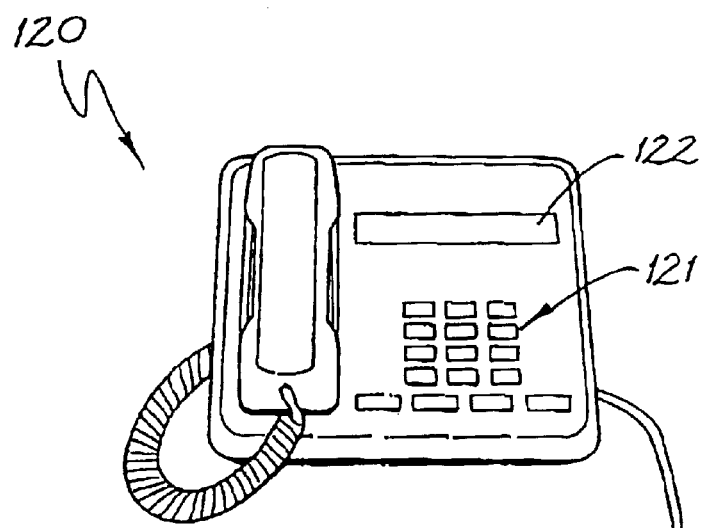
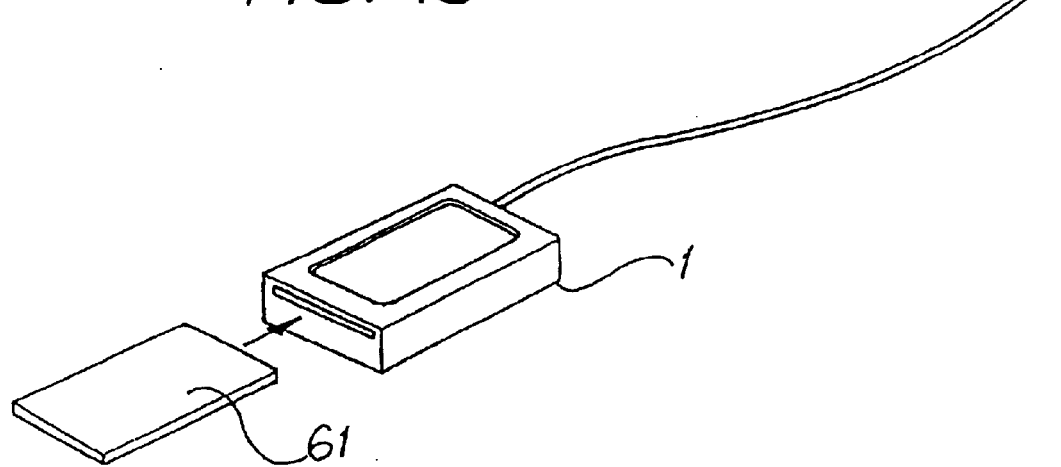
FIG. 13

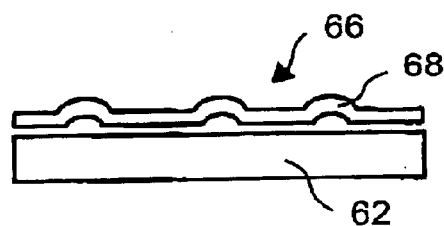
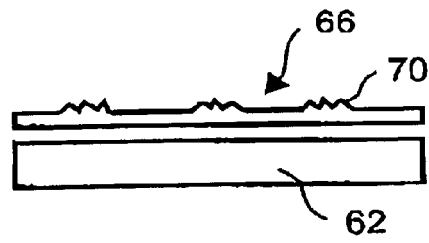
Fig. 22    Fig. 24
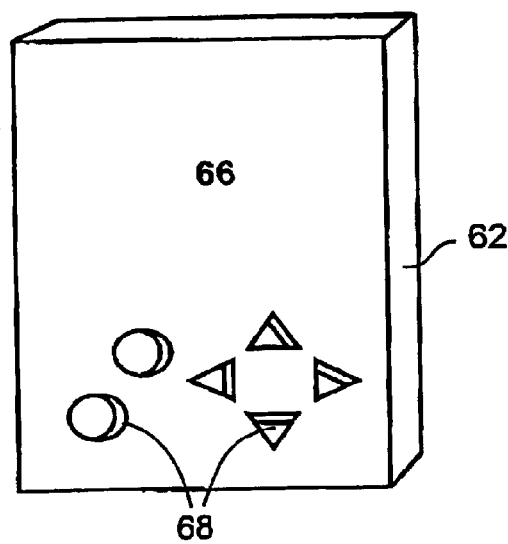
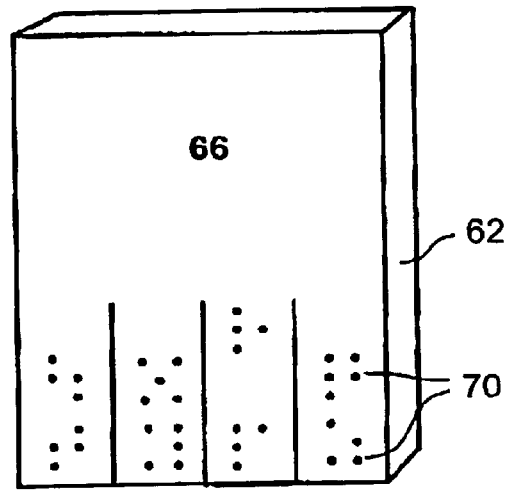
Fig. 23    Fig. 25

USER PROGRAMMABLE SMART CARD INTERFACE SYSTEM HAVING AN ARBITRARY MAPPING

This application is a continuation-in-part of application Ser. No. 09/414,558, filed Oct. 8, 1999, pending.

TECHNICAL FIELD OF THE INVENTION

The present invention relates to a control template or smart card for use with a related control device, as well as methods of production and use of such a control template.

The invention has been developed primarily for use with remote control systems, automatic tellers and video game controllers, and will be described hereinafter with reference to these and other applications. However, it will be appreciated, particularly in view of the large number of alternative examples given, that the invention is not limited to these fields of use.

BACKGROUND

Control pads of various types are known and used across a relatively wide variety of fields. Typically, such pads include one or more keys, buttons or pressure responsive areas which upon application of suitable pressure by a user, generate a signal which is supplied to associated control circuitry.

Unfortunately, prior art control pads are somewhat limited, in that they only allow for a single configuration of keys, buttons or pressure sensitive areas. Standard layouts rarely exist in a given field, and so a user is frequently compelled to learn a new layout with each control pad they use. For example many automatic teller machines ("ATMs") and electronic funds transfer at point of sale ("EFTPOS") devices use different layouts, notwithstanding their relatively similar data entry requirements. This can be potentially confusing for a user who must determine for each control pad the location of buttons required to be depressed. The problem is exacerbated by the fact that such control pads frequently offer more options than the user is interested in, or even able to use.

Overlay templates for computer keyboards and the like are known. However they are relatively inflexible in design terms and require a user to correctly configure the system with which the keyboard is associated, each time the overlay is to be used.

It is the object of the present invention to provide a control template or smart card which is useful in a wide range of applications. In particular, in order to achieve the broadest utility it is desirable to have third parties other than the card manufacturer and the ultimate end user able to program the card with either the third party's intended use or the ultimate end user's intended use.

Novelty searches conducted after the earliest priority date of the present application disclosed International Patent Application No. PCT/FR95/00827 published in French under International Patent Publication No. WO95/35534. An English language translation of the specification is conveniently available as Australian Patent Publication No. AU-A-28896/95. That specification discloses a card reading device (also referred to as a control housing) intended for the remote control of equipment, for example. The control housing consisted of a transparent key pad arranged to overlie a smart card/memory card having indicia regularly arranged on the surface of the card at positions corresponding to the keys of the keypad.

Thus a television manufacturer, for example, could manufacture such a smart card and supply the smart card together with the control housing and a television. Then the customer would be able to utilise the control housing in conjunction with the smart card as a remote control device for the television. In this way the television manufacturer, would not need to manufacture a specific remote control device for their product but could utilise a generic card reading device in conjunction with their specific smart card.

However, this concept is limiting because the control data in the smart card for the machine to be controlled comes from the machine manufacturer and thus is limited in its application.

DISCLOSURE OF THE INVENTION

According to a first aspect of the invention, there is provided a customisable user interface system comprising;

a card comprising a substrate, a memory device associated therewith, and indicia formed on said substrate and user interpretable to relate to functions stored within said memory; and a reader device for said card comprising a touch sensitive device arranged to overlay said card and through which said indicia are visible, characterised in that said touch sensitive device comprises a membrane via which said indicia, arbitrarily arranged on said substrate, may be selected.

According to a second aspect of the invention, there is provided an control template for a user interface system, said template comprising:

an electronic card formed of a substrate having associated therewith a memory device;

a plurality of indicia being at least one of arbitrarily positioned, and arbitrarily shaped, on said substrate; and mapping data stored within said memory device and defining a mapped position of each said indicium relative to the substrate.

According to a third aspect of the present invention, there is provided a read device for a control template interface card, said device comprising:

a substantially transparent touch sensitive membrane arranged to overlay said interface card; and means for reading a memory device formed in said interface card in response to a users touch of said membrane.

BRIEF DESCRIPTION OF THE DRAWINGS

Preferred embodiments of the invention will now be described, by way of example only, with reference to the accompanying drawings, in which:

FIG. 13 is a schematic perspective view of an associated telephone device and controller;

FIGS. 22 and 23 are a longitudinal section view and a perspective view respectively of another embodiment of the smart card shown in FIG. 1;

FIGS. 24 and 25 are a longitudinal section view and a perspective view respectively of an alternative embodiment of the control template shown in FIGS. 22 and 23;

DETAILED DESCRIPTION INCLUDING BEST MODE

Figure 1:
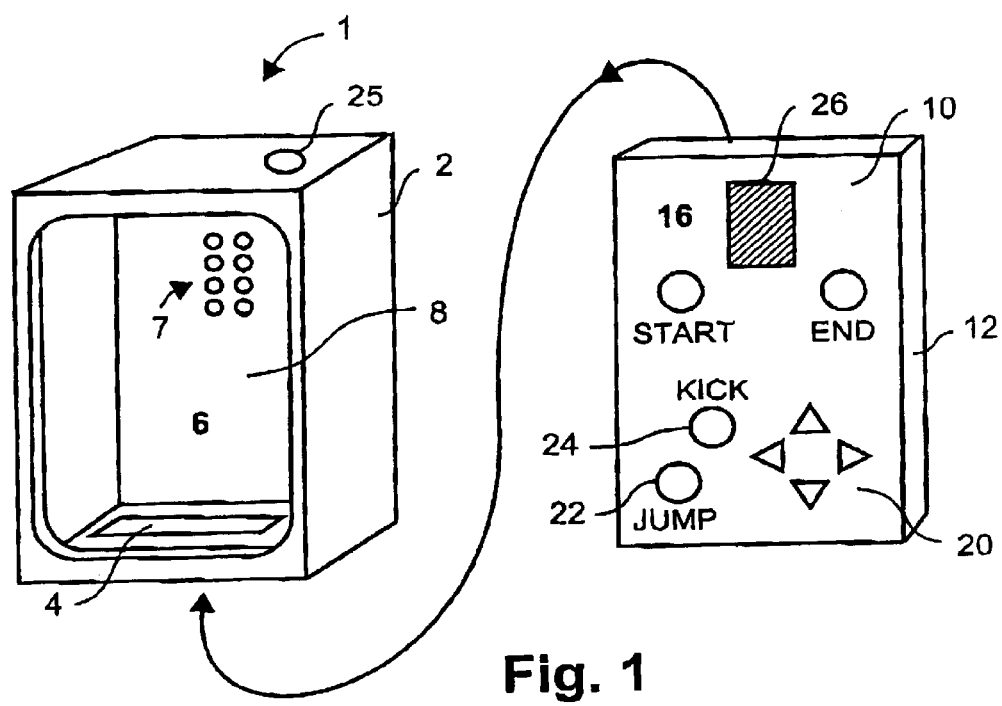
FIG. 1 is a perspective view of a controller and associated control template, according to a first embodiment of the invention.

Referring to FIG. 1, there is provided a controller 1, having a housing 2 which defines a control template receptacle 4 and a viewing area 6. Data reading means are provided in the form of exposed contacts 7 and associated control circuitry (not shown). The controller 1 also includes sensor means in the form of a substantially transparent pressure sensitive membrane 8 covering the viewing area 6.

Figure 2:
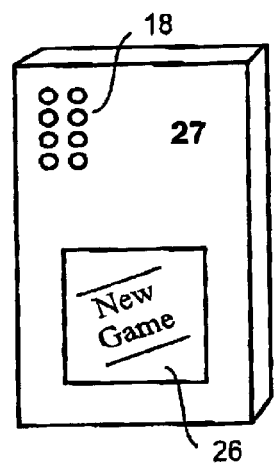
FIG. 2 is a perspective view of an opposite side of the control template shown in FIG. 1.
Figure 3:
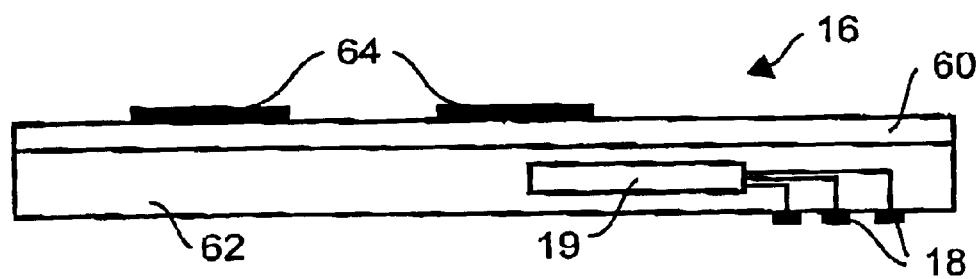
FIG. 3 is a longitudinal cross-sectional view of the control template shown in FIG. 1.

The controller 1 is configured for use with a control template, which, in the embodiment shown in FIGS. 1 to 3, takes the form of a smart card 10. The smart card 10 includes a laminar substrate 12 with control indicia in the form of a four way directional controller 20, "jump" button 22 and "kick" button 24 printed on an upper face 16 thereof Other non-control indicia, such as promotional or instructional material, can be printed alongside the control indicia (for example, advertising material 26 on smart card 10) or on a reverse face 27 of the card (FIG. 2).

The smart card 10 includes storage means in the form of an on-board memory chip 19 (FIG. 3) for storing mapping data associated with the control indicia. The smart card 10 also includes data contacts 18 connected to the on-board memory chip 19 corresponding with the exposed contacts 7 on the controller 1.

An adhesive label 60 has printed upon it a number of control indicia 64 and is affixed to the laminar substrate 62. By using this arrangement, a home user can print a suitable label for use with a particular control template by using a printer, such as a colour BUBBLE JET (Registered Trade Mark) printer manufactured by Canon, Inc.

In use, the smart card 10 is inserted into the control template receptacle 4, such that the pressure sensitive membrane 8 covers the upper face 16 of the smart card 10. The control indicia are visible within the viewing area 6 through the transparent pressure sensitive membrane 8.

The exposed contacts 7 and associated circuitry are configured to read the mapping data associated with the control indicia from the memory chip 19, either automatically upon insertion of the smart card 10 into the control template receptacle 4, or selectively in response to a signal from the controller 1. This signal can, for example, be transmitted to the smart card 10 via the exposed contacts 7 and data contacts 18.

Once the mapping data associated with the control indicia 14 has been read, a user can press areas of the pressure sensitive membrane 8 on or adjacent the underlying control indicia. By sensing the pressure on the pressure sensitive membrane 8 and referring to the mapping data, the controller 1 can deduce which of the control indicia the user has pressed. For example, if the user places pressure on the pressure sensitive membrane 8 adjacent the "kick" button 24, the controller 1 will assess the position at which the pressure was applied, refer to the mapping data, and determine that the "kick" button 24 was selected. This information can then be used to control a game running on an associated video game console (of conventional construction and not shown).

In a preferred form, the controller includes a transmitter (of conventional type and not shown), such as an infra-red (IR) transmitter or radio frequency (RF) transmitter, for transmitting information in relation to buttons selected by the user. In the embodiment of the controller 1 shown in FIG. 1, an IR transmitter having an IR light emitting diode (LED) 25 is provided. Upon selection of one of the control indicia 20, 22, 24, 64, the controller 1 causes information related to the selection to be transmitted to a remote video console (not shown) where a corresponding IR receiver detects and decodes the information for use in controlling a game being played.

Any suitable transmission method can be used to communicate information from the controller 1 to the remote video game console, including direct hard-wiring. Moreover, the video console itself can incorporate a transmitter, and the controller 1 a receiver, for communication in an opposite direction to that already described. The communication from the video game console to the controller 1 can include, for example, handshaking data, setup information, or any other form of information desired to be transferred from the video game console to the controller 1.

Figure 4:
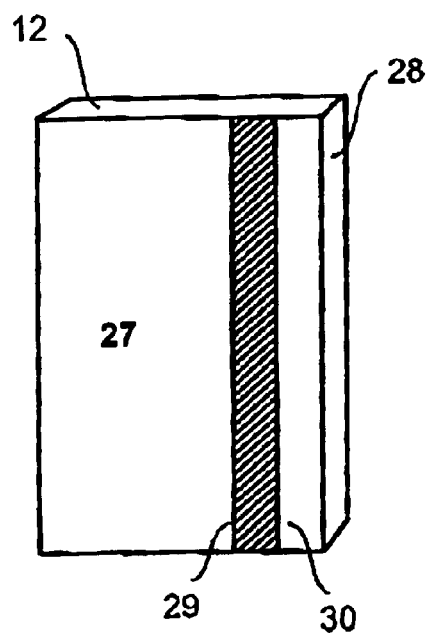
FIGS. 4 and 5 are perspective views of the rear face of alternative embodiments of the control template shown in FIG. 1.

Turning to FIG. 4, there is shown an alternative embodiment of the control template shown in FIGS. 1 and 2, taking the form of a control card 30. The control card 30 still includes a laminar substrate 12 which bears control indicia. However, the storage means in this embodiment takes the form of a magnetic strip 29 formed along an edge 28 of the reverse face 27 of the control card. The mapping data is stored on the magnetic strip 29 in a conventional manner. A corresponding controller (not shown) for this embodiment includes a magnetic read head positioned at or adjacent an entrance to the corresponding control template receptacle. As the control card 30 is slid into the control receptacle, the mapping data is automatically read from the magnetic strip 29 by the magnetic read head. The controller is then operated as described in relation to the FIG. 1 embodiment.

Figure 5:
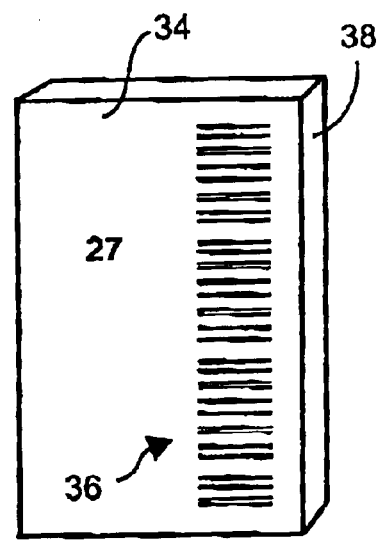

FIG. 5 shows another embodiment of a control template in the form of a control card 34, in which the storage means takes the form of machine readable indicia. In the embodiment shown, the machine readable indicia takes the form of a barcode 36 formed along an edge 38 of the reverse face 27 of the card 34. The mapping data is suitably encoded, and then printed in the position shown A corresponding controller (not shown) for this embodiment includes an optical read head positioned at or adjacent an entrance to the associated control template receptacle. As the card 34 is slid into the control receptacle, the mapping data is automatically read from the barcode 36 by the optical read head. Alternatively, the barcode can be scanned using a barcode reader associated with the controller immediately prior to inserting the control template, or scanned by an internal barcode reader scanner once the control template has completely been inserted. The control template is then operated as described in relation to the FIG. 1 embodiment. It will be appreciated that the position, orientation and encoding of the barcode can be altered to suit a particular application. Moreover, as will be explained hereafter, any other form of machine readable indicia can be used, including embossed machine-readable figures, printed alpha-numeric characters, punched or otherwise formed cut outs or even optical or magneto optical indicia.

Figure 6:
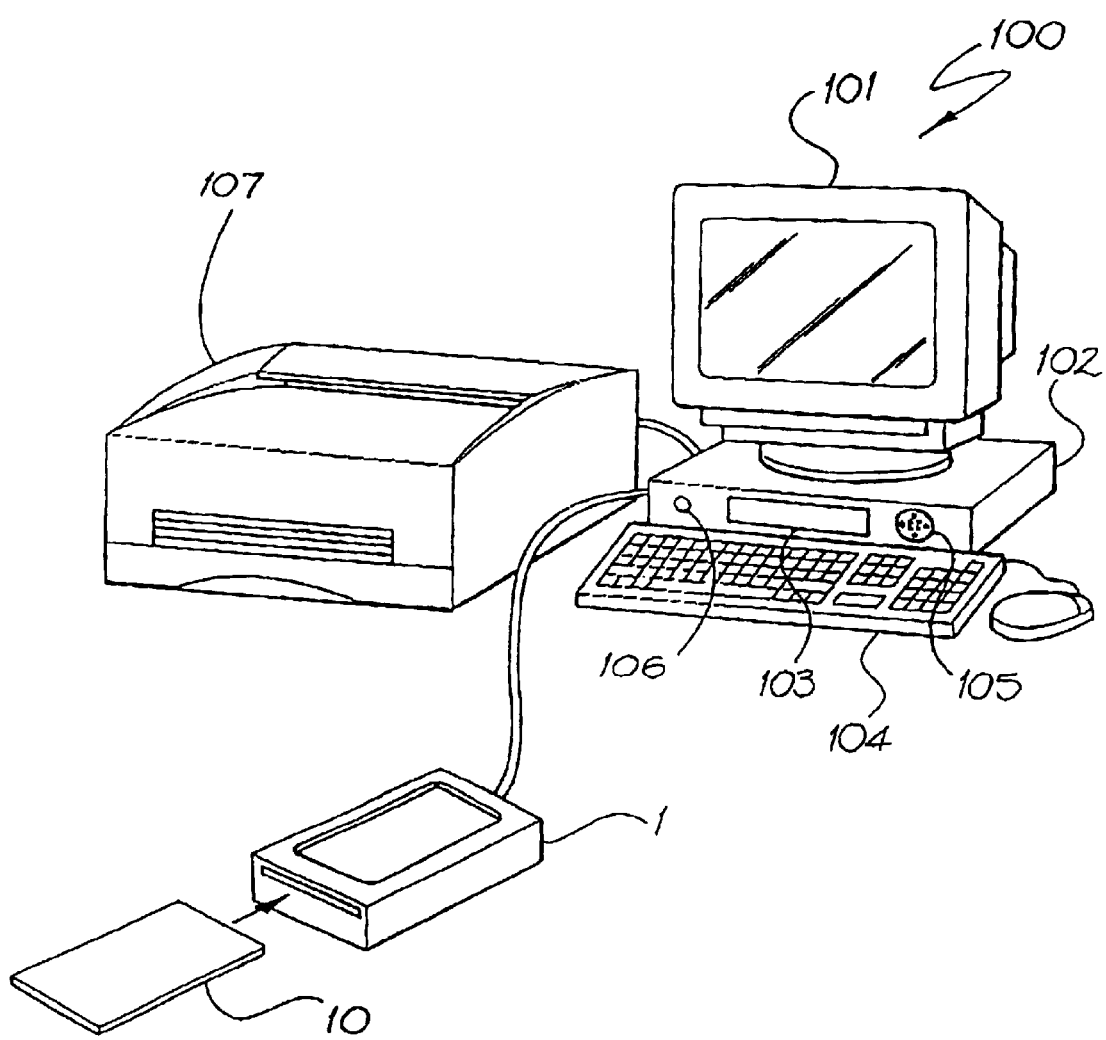
FIG. 6 is a schematic perspective view of associated display and computing apparatus.

As shown in FIG. 6, the controller 1 can also be hardwired to a display device 100 with computing power. Such a device 100 includes a screen 101, a personal computer 102, and, if desired, a memory device receptacle such as a video recording nacelle 103. The nacelle 103, and screen 101 under the control of the computer 102 functions as a video cassette recorder (VCR) Preferably a keyboard 104 and loudspeaker 105 are also provided. Instead of being hardwired, an IR transceiver 106 can also be included to communicate with the equivalent device 25 (FIG. 1) of the controller 1. A printer 107 is also provided.

The preferred control template comprises a programmable smart card which can be customizable by a third party (viz a party other than the manufacturer of the card and/or card reader). The third party may be the ultimate user of the card itself, or may be an intermediary between the manufacturer and user. In one application, the smart card is programmed and customized for one touch operation to obtain a service over a network. Examples of services over the network include those services described herein after with reference to the various embodiments. In another application, the smart card may be programmed for obtaining a service locally at a set top box. In a still further application, the smart card can be pro med for obtaining a service both remotely and locally. For instance, the smart card may be programmed to retrieve an application remotely from a is network and load it on a set top box. The latter smart card may be additionally programmed to obtain a service from the loaded application on the set top box. Various embodiments of the smart card are shown in FIGS. 7 to 17. The programming process of the smart card is described in more detail below with reference to FIG. 20.

Figure 7:
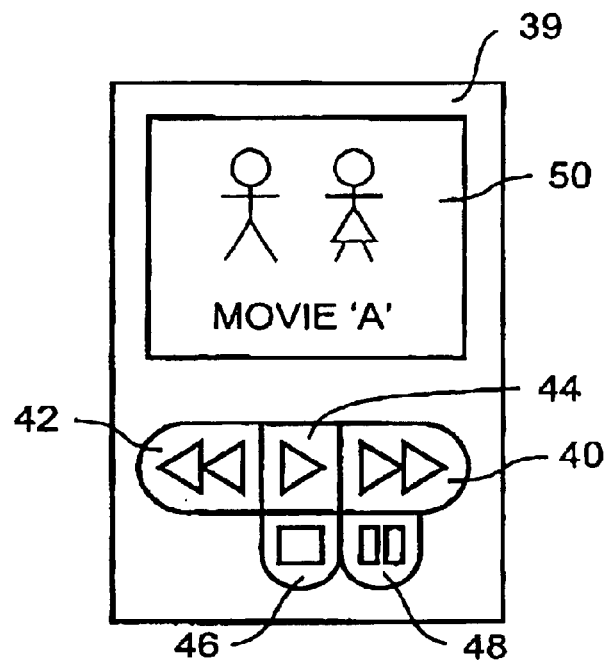
FIGS. 7 to 12 are plan views of alternative embodiments of the control template shown in FIG. 1.

FIG. 7, for example, shows an arrangement of control indicia on a control card 39 20 for use in controlling a video recorder. The control indicia includes "Fast Forward" 40, "Rewind" 42, "Play" 44, "Stop" 46 and "Pause" 48 buttons. Advertising material 50 is printed above the control indicia. Depending upon the mode in which the control card 39 is designed to operate, the advertising material 50 can simply be a passive indicator of the control card's intended use. By using the control card 39 with the controller 1 of FIG. 6, manipulating the various video controls printed on the card will result in playback on the screen 101 of a video corresponding to the advertising material 50. For example, if the advertising material 50 relates to a movie, manipulating the controls will playback and otherwise control that particular movie through the device 100 which functions as a video reproduction apparatus. In this embodiment, the card can be supplied with a bought or rented video movie. Alternatively, the movie can be accessed from a cable, satellite or other pay-per-view television arrangement. In the latter case, distribution of the card as a marketing tool can increase viewer interest in particular movies. It will be appreciated that this embodiment can be adapted for any pay-per-use arrangement Alternatively, the control indicia can be used to control the video reproduction apparatus in a known way. For example, pressing "Play" 44 results in the replay of whichever movie is presently loaded into the device 100 associated with the controller 1. In this mode, the advertising material 50 can represent a passive marketing image having no relationship to the controls themselves or the video to be replayed and otherwise manipulated by the control indicia.

Alternatively, the storage means associated with the control template can store mapping data associated with the advertising material 50. By "pressing" the pressure sensitive membrane 8 on or adjacent the advertising material 50, a user can instigate playback on the video reproduction device 100 of marketing imagery associated with the advertising material 50. For example, in one embodiment, the advertising material 50 is related to a movie 'A', and is bundled with a recorded video medium such as a video cassette or DVD containing a movie 'B'. Once the recorded video medium is positioned within the playback device 100, the control template 39 is inserted into the controller 1. Upon pressing "Play" 44, Movie 'B' is played back through the device 100. Playback is controlled using the various control indicia on the card. However, at any time, pressing the advertising material 50 causes a preview of movie 'B' to be played via the device 100. It will be appreciated that the preview of movie 'B' is actually stored on the same recorded video medium as movie 'A', and that the advertising material simply represents a link thereto. It will also be appreciated that in alternative embodiments the recorded advertising material can be stored on the control card 39 itself, or even in storage facilities not included on the card but accessible to the device 100. In one embodiment, the remote storage facilities are accessible via a computer network, such as the internet.

Figure 8:
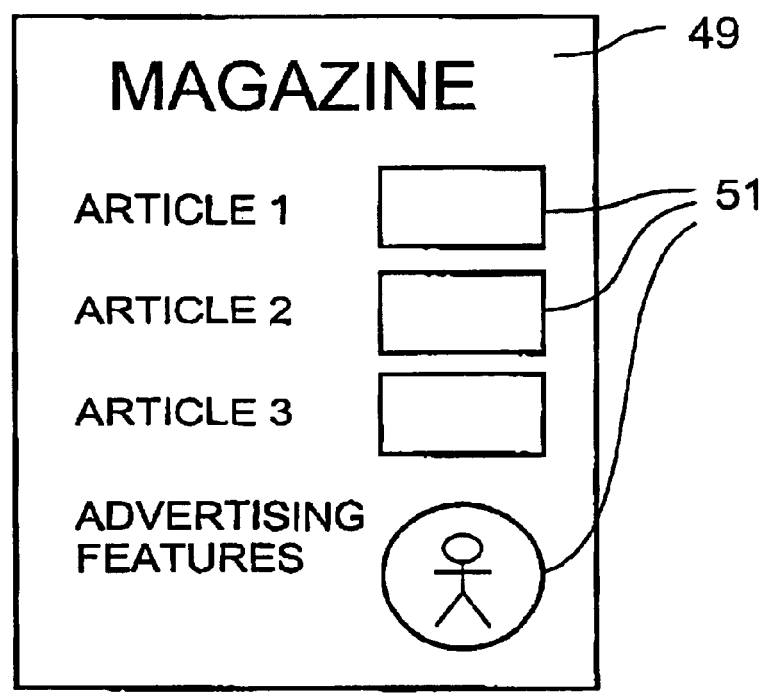

FIG. 8 shows an alternative control template 49 which represents a magazine, the contents of which can be "browsed" using the control indicia. Along with the mapping data, the "on-card" storage means (19 of FIG. 3) includes magazine content data such as text, images, and multimedia content such as sound, video and animation. Various icons 51 link with corresponding portions of magazine data, which, when selected, are reproduced via the device 100. As with the previous embodiment, some or all of the magazine content can be stored in a remote location accessible via a communications or computer network, such as the Internet. In this case, it will be usual for the control card 49 to incorporate security access features, which allow the user of the control card 49 to access the required material whilst preventing general access via an unauthorised Internet browser or the like. This ensures that the person accessing the material has the right to access the data by having purchased or otherwise legitimately obtained the requisite control card 49.

Figure 9:
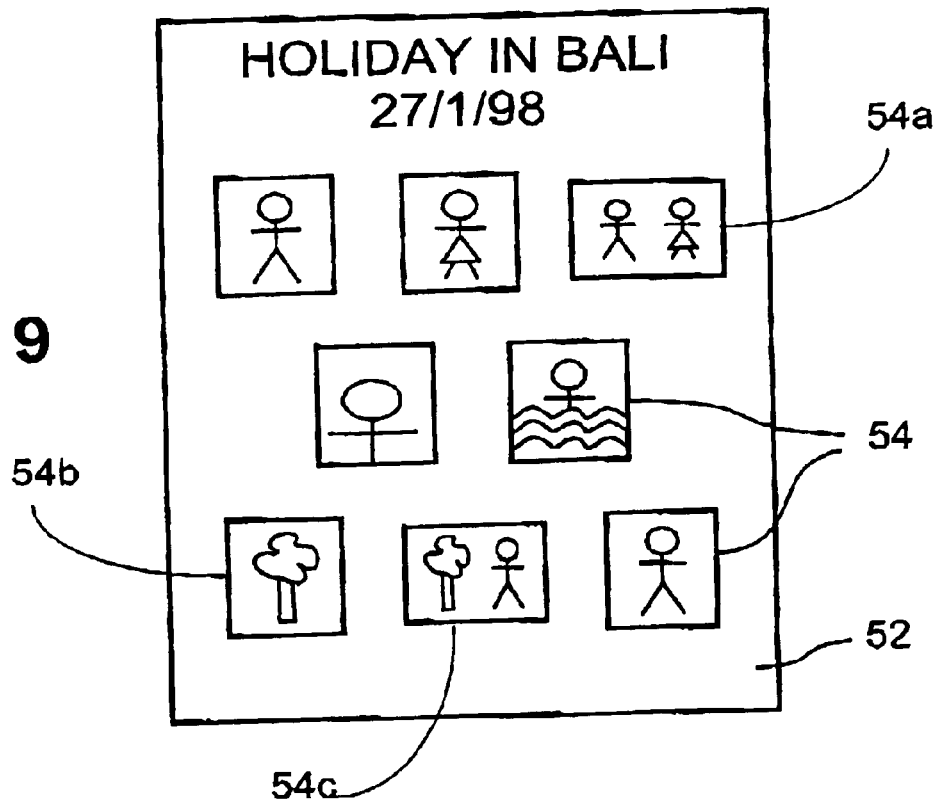

Turning to FIG. 9, there is shown an alternative embodiment control template in the form of a table of contents card 52. The table of contents card 52 is a summary card for a virtual photo album, or for a series of photographs or still images stored on the card, in a remote storage location or on an image storage medium such as a CD-ROM or DVD disc. The summary on the card appears as a series of thumbnails 54 representing larger, higher resolution versions of the photographs or still images which are stored remotely or on the image storage medium. By positioning the table of contents card 52 into the controller 1 and pressing any one of the thumbnails 54, the corresponding larger, higher resolution version of the still image or photograph being displayed on the screen 101.

In one embodiment, the table of contents card 52 is supplied when a user deposits photographic film for development. Once the film is developed, in a service-providing device the resultant images are digitized and a processor (not shown) in the service-providing device stores them into a digital storage medium, such as a CD-ROM or DVD disc. The processor generates a corresponding table of contents card 52. A film shop (photo shop) gives it to a user (customer) with the digital storage medium. The service that is provided by the shop is to give the card 52 and the storage medium to customers.

Alternatively, the processor in the device in the film shop stores digitized images into a memory at a remote site, for access by the user via a computer network such as the Internet. In this latter case, the user is simply supplied the table contents 52, which can be taken home and inserted into the controller 1 as desired. Another service that is provided by the shop is to give the card 52 and provide the remote site to customers.

By user selecting a particular thumbnail, processor 401 sends function data (command and memory address) to a device having the memory medium that located in proximity to the user or a remote site (a server) having the memory. After the corresponding high resolution image is retrieved in the memory such like CDROM or DVD using the memory address, the image is read via local data connection to computer 102 and displayed on the screen 101 for viewing by the user. And after the corresponding high-resolution image is retrieved in the memory at remote site using the memory address, the image is downloaded via the Internet to computer 102 and displayed on the screen 101 for viewing by the user.

In other embodiments, each thumbnail 54 represents a sequence of images, or a particular shot, or point in a series of sequential video frames. An example of where this might be used is in a video recording, wherein the first same of each take is automatically recorded for later review. By producing a table of contents card 52 having a still image 54 of the first frame of each of the takes on the card, a director or editor can quickly move the display device 100 between different takes without having to use cumbersome manual fast forward or rewind buttons.

Figure 38:
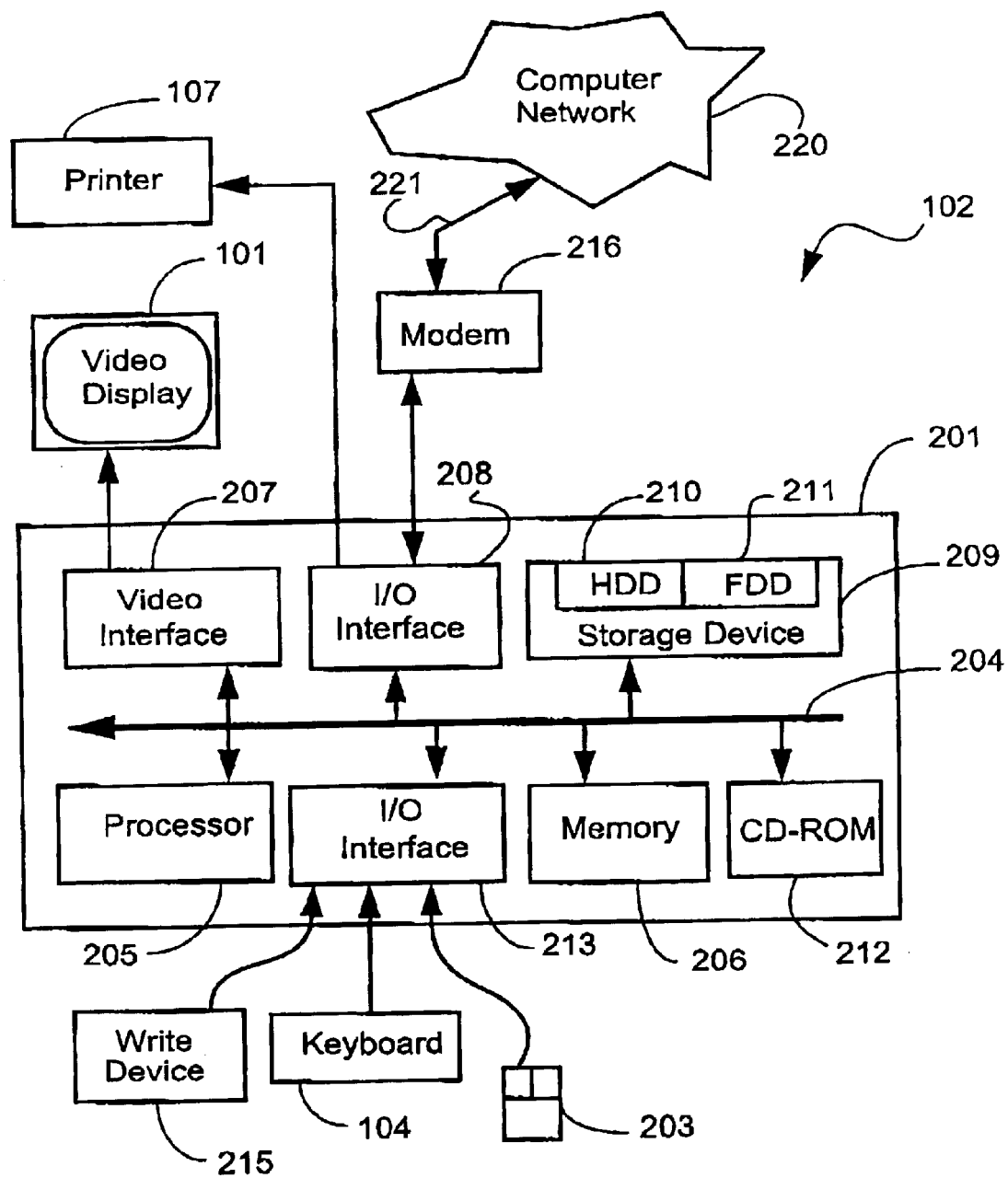
FIG. 38 is a schematic block diagram of a general purpose computer useful in putting some embodiments of the present invention into practice.

In the aforementioned embodiments, it is necessary for the storage means 19 (see FIG. 19) associated with each of the table contents 52 to store mapping data associated with each of the thumbnails, relationship data linking each thumbnail with its corresponding image or sequence of images available to the device 100 (the device 102 in FIG. 38) and function data (command and memory address) to read a specific image data from memory medium such like CD-ROM 212 in FIG. 38 or down load a specific image data from a remote site such like a server via network 220 in FIG. 38.

Figure 39:
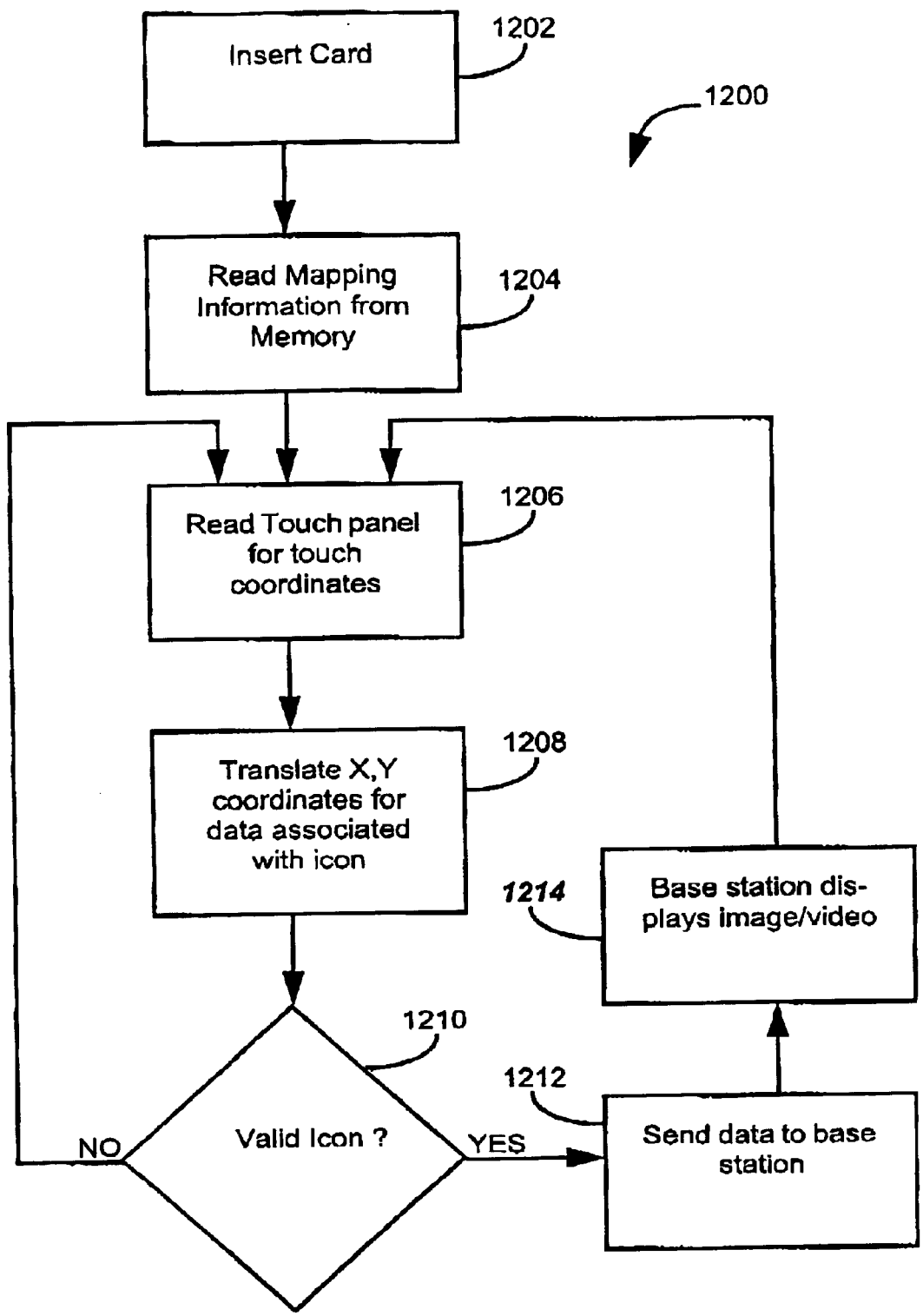
FIG. 39 shows a process for providing a virtual image album using a table of contents interface card.
Figure 40:
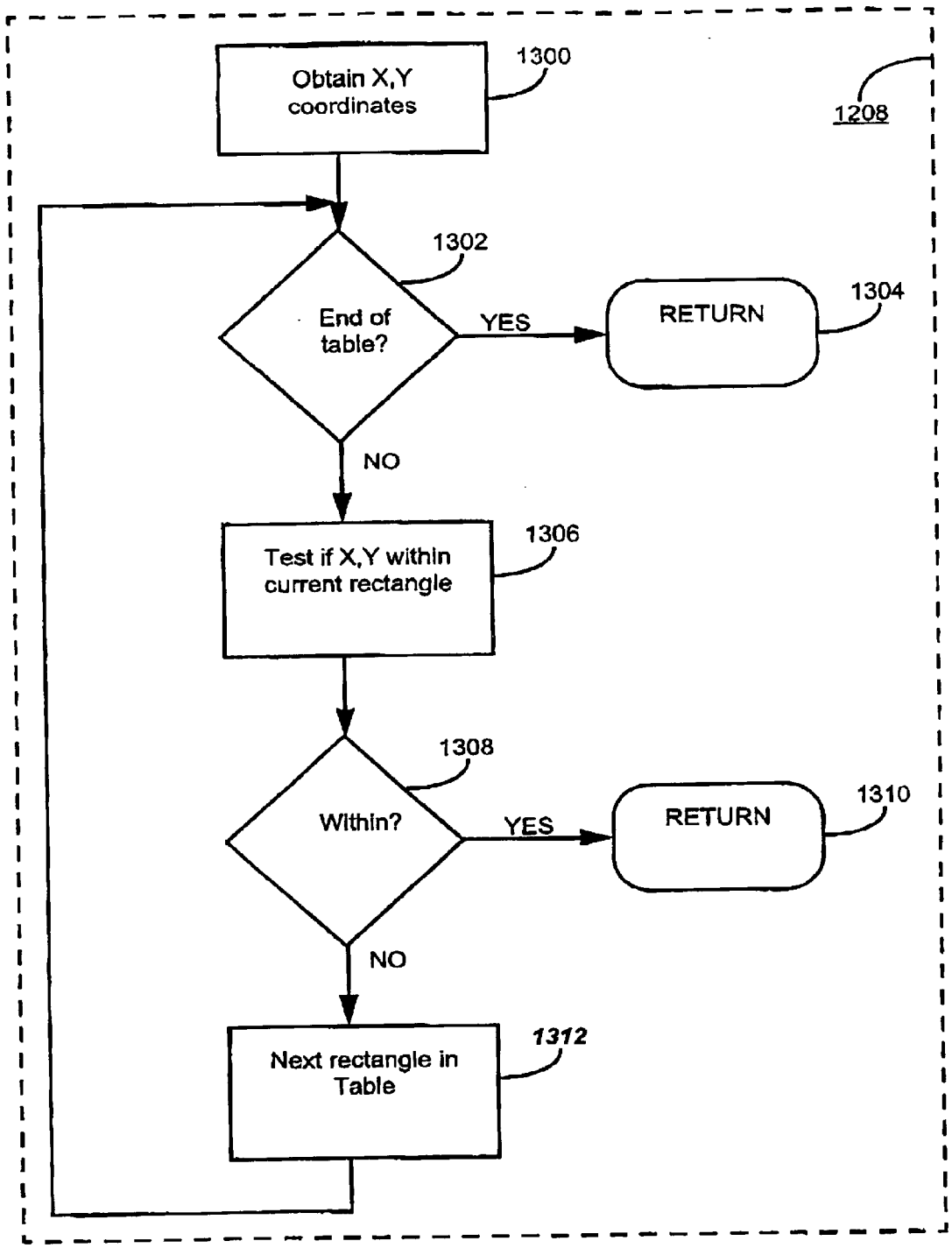
FIG. 40 shows a process for determining if a user's press corresponds to a predetermined icon position in regard to FIG. 39.

FIG. 39 shows a process 1200 made up of a series of method steps, for displaying the virtual photo album or series of video sequences as described in relation to FIG. 9. Programs indicating flowcharts in FIG. 39 and FIG. 40 are stored in a memory unit 402 (ROM) which are processed by processor unit 401 in card reader 400 in FIG. 41 (controller 1).

Figure 41:
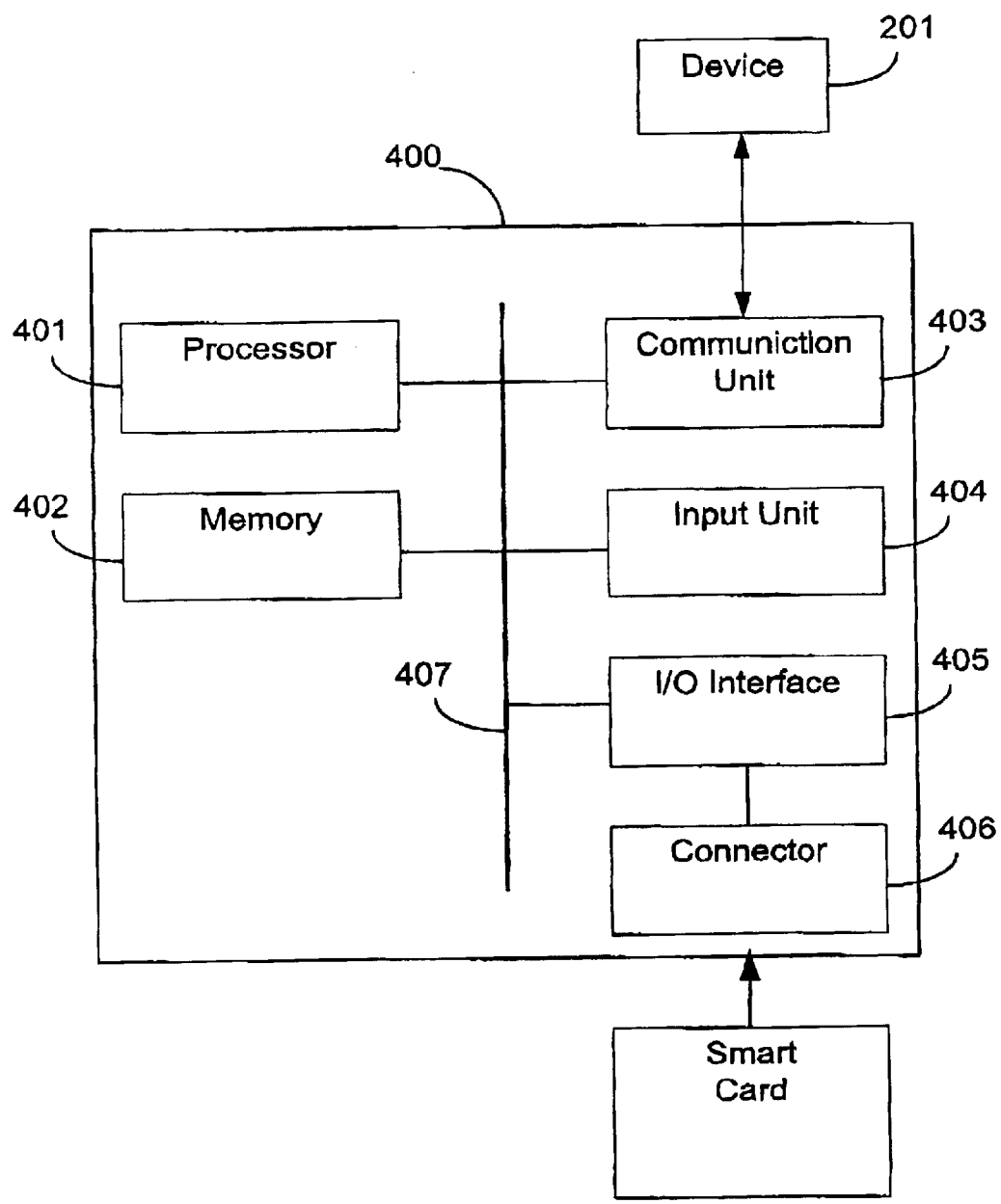
FIG. 41 shows a block diagram representation of a controller.

FIG. 41 is schematic block diagram of controller (Card reader).

Card reader 400 typically includes at least one Processor unit 401, a memory unit 402, for example formed from semiconductor random access memory (RAM) and read only memory (ROM), and Connector unit 406 is a physical interface which couples the smart card to the Card reader 400.

An input/output (I/O) interface 405 electrically interfaces the smart card to the Processor unit 400 and memory unit 402 via an internal bus 407.

The memory unit 402 stores the various programs, which are represented by FIG. 18A, FIG. 18B, FIG. 39 and FIG. 40.

An input unit 404, and Communication unit 403 are used to communicate information memory addresses and commands to a device 201 such as a Set top box (STB). The input unit 404 may comprise a touch sensitive membrane (touch panel). Preferably, the communication unit 403 includes an infrared light emitting diode (LED) to electro magnetically couple the reader 400 to the Set top box.

The STB receives information from Communication unit 403, and applications stored in the STB process the information.

After the external device receives the function data from controller 1 (card reader 400), A processor (not shown) in the external device retrieves a specific image data that user designated by the smart card indicia using the memory address in a memory medium such like CD-ROM 212 or a memory in a remote site such like a server via a network.

In a first step 1202, processor 401 determines that the table of contents card 52 is inserted into the controller 1. In a following step 1204, processor 401 reads mapping information from the memory of the table of contents card 52 (smart card) via I/O interface 405. Thereafter, in a step 1206, processor 401 read touch coordinates from the touch sensitive membrane 8 via input unit 404, the coordinates indicating a location with has been touched by the user. Thus, for example, if the user touches a thumbnail 54a, then processor 401 reads a first set of touch coordinates in the step 1206. In contrast, if the user touches another thumbnail 54b, then processor 401 reads a different set of touch coordinates in the step 1206.

In following step 1208, processor 401 checks X,Y coordinates which have been read in the step 1206 for conformity with a valid icon. This step is to ensure that user has, in fact, touched an area on the surface of the card 52 which is associated with a particular thumbnail. This is discussed in further detail in regard to FIG. 11. Thereafter, in a decision step 1210, processor 401 executes a validity check in order to decide where the user has indeed selected a valid icon. If a valid icon has been selected the process 1200 is directed in accordance with a "YES" arrow to a step 1212, which processor 401 sends appropriate data (a command and memory address) to a base station such like device 100 (device 102 in FIG. 38), or a remote image server, which can be remotely connected to the computer network 220 (see FIG. 38, nothing that the base station and image server are not explicitly shown therein).

Thereafter, the process is directed to a step 1214 in which processor 205 in the base station 201 displays the image/video data which has been requested by the user, transmitting the required data over the network 220 to be displayed, for example, on the video display 101. The process 1200 is, thereafter, directed to the step 1206 which allows the user to select a further thumbnail, e.g. 54c.

Returning to the decision step 1210, if a valid icon has not been selected, as would be the case if the user touches a blank spot on the card surface, then the process 1200 is directed in accordance with a "NO" arrow to the step 1206, enabling the user to make a further thumbnail selection.

Figure 34:
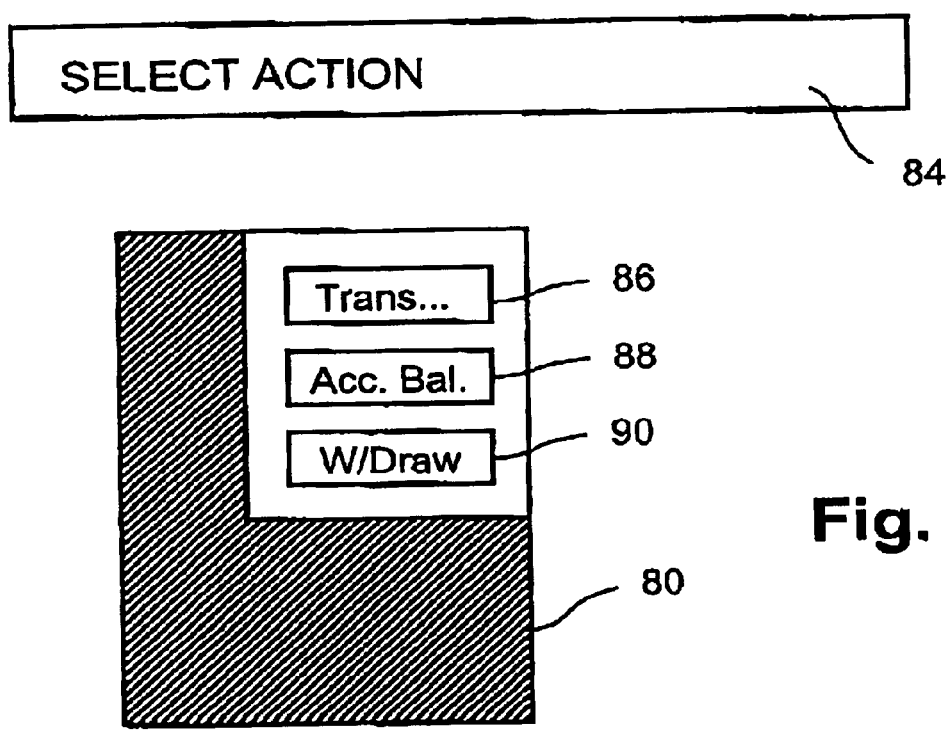

Turning to FIG. 40, there is shown in more detail the step 1208 (see FIG. 39), in which the X,Y coordinates of the users press, and the X,Y coordinates listed in a table stored in the smart card memory 19 (see FIG. 3) are compared by processor 401. The X,Y coordinates listed in the table stored in the smart card memory 19 constitute, for example, rectangles within which a users press must fall to be "valid". In the step 1300, processor 401 first obtains the X,Y coordinates via the transparent membrane 8 of the smart card reader (see FIG. 34) where the user has pressed.

The process 1208 then proceeds to a loop comprising the steps 1302, 1306, 1308 and 1312, which loops through X,Y coordinates of each rectangle entry in the table stored in the smart card memory, searching for a rectangle encompassing the coordinates obtained in the step 1300. If the end of the table is reached without a match being found, the process 1208 proceeds to a step 1304 by which the process 1208 returns a conclusion that no matching X,Y coordinates have been found.

In the course of a loop, the process 1208 proceeds from the step 1300 to a step 1302 which tests for the end of the table. As noted, if the end of the table is detected, then the process 1208 is directed to the RETURN step 1304. If, on the other hand, the end of the table is not detected, then the process 1208 is directed to a step 1306 which tests whether the X,Y coordinate obtained in the step 1300 falls within the current rectangle in the table which is being considered.

In a following decision step 1308, if the X,Y coordinate is found to be within the rectangle being considered, then the process 1208 is directed in accordance with a "YES" arrow to the step 1310 which returns X,Y coordinates of the current rectangle, and its associated data. This associated data is the command data for performing the desired service indicated by the button which has been pressed by the user. In the case of the image album, the desired service might be to display a high resolution version of the selected still image, or perhaps, to play a video clip associated with the selected thumbnail.

If, on the other hand, the X,Y coordinate obtained in the step 1300 does not fall within the current rectangle, then the process 1208 is directed in accordance with a "NO" arrow to a step 1312 which directs the process to the next rectangle in the table. The process 1208 is then directed to the decision step 1302.

Although the above description relates to a remote base station or image server which houses the desired images, and which is connected to the network 220, it will be apparent that the aforementioned images can equally be stored on an image storage medium such as a CD-ROM or DVD disk, which are co-located with the user. The described functionality of the table of contents card and the associated system elements is equally applicable whether images are stored remotely and down loaded over the Internet, or whether images are stored on a local computer, CD-ROM or DVD disk.

The use of the table of contents card 52 thus provides the user with an advantageous mechanism for retrieving still images and/or video clips, these being stored either remotely on a server elsewhere in the network, or locally on a local storage device, under control of a convenient control template 52.

Figure 10:
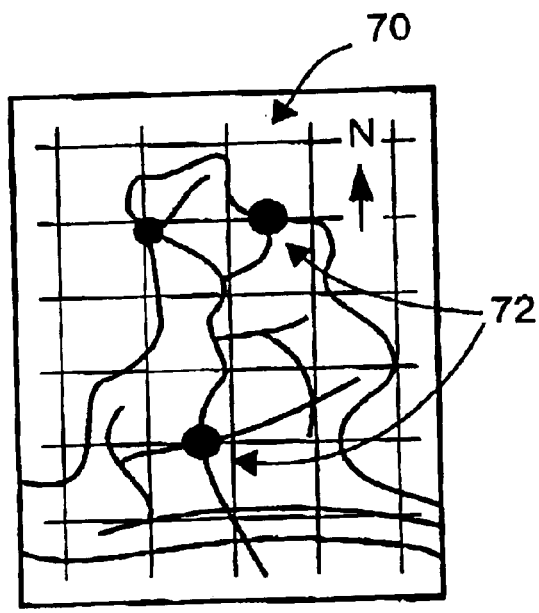

In FIG. 10, there is shown a control template in the form of a tourist information map 70 having a plurality of areas of interest 72 highlighted. Upon inserting the tourist map 70 into the controller 1, a user is able to select any one of the areas of interest 72 for which further information is required. This information can be displayed on the associated display device 100 after being retrieved either from its internal memory or from a remote memory such as a corresponding Internet site. As will be apparent from FIG. 10, the map 70 incorporates a regular grid, as is typical of maps, however the indicia 72 are not regularly arranged according to the grid or to any apparent scheme. Further, the individual indicia 72 are of varying size, in this case related to the size of the cities they represent in the map 70, and can also, in the general case, be of varying shape Bounding boxes of arbitrary shape, and associated mapping data, can be used to delineate different areas of interest (ie indicia) within the map 70.

Figure 11:
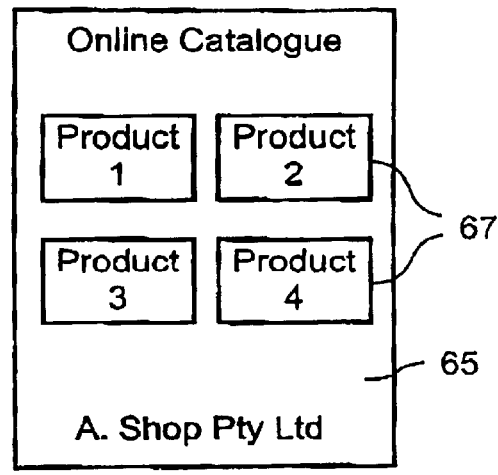
Figure 12:
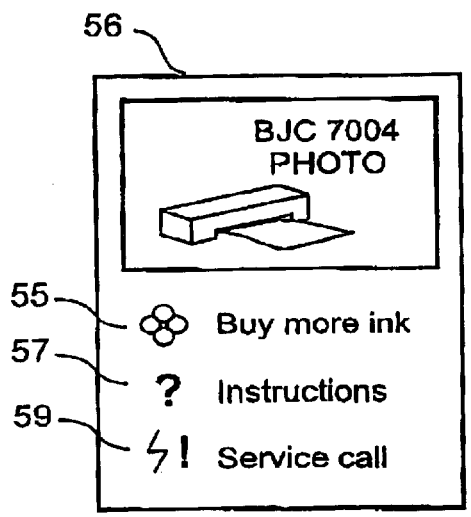

FIG. 11 shows a control template 65 configured for use as a catalogue or advertising brochure, which can be delivered to post boxes, or distributed with magazines, videos or the like. By sliding the control template 65 into the controller 1, the various control indicia in the form of control icons 67 can be selected. Each of the control icons 67 is associated with a particular product, and pressing that icon results in information on the associated product being displayed on a screen 101. Additionally, if the user is interested in a displayed product, an option can be provided whereby the user automatically orders the product once selected. The brochure is used with the home computer system 103 which is programmed with data required to effect a transaction, such as credit card details and expiry date, personal details, and the address to which to send the product. Of course, suitable security can be implemented requiring a user to enter a password before the various details are forwarded from the computer system. As with previous embodiments, the information can be sent via a communications network such as the internet FIG. 12 shows a control template 56 for use with, in this case, a printer such as the printer 107 of FIG. 6. In the embodiment shown, the control template includes a "Buy More Ink" indicium 55, an "Instructions" indicium 57 and a "Service Call" indicium 59. With the template 56 in the controller 1, the "Buy More Ink" indicium 55, when pressed, sends a request via the computer 102 and the Internet, or other communications network, to an ink supplier. In the preferred form, the request for more ink also forwards details such as the make and model of the printer, the type of ink required, the address and location of the printer within an organisation, and "bill to" data enabling an invoice to be generated.

The "Instructions" 57 indicium calls up an instructions menu on the associated display screen 101. This enables the user to then conduct a self-operated tutorial on the computer 102 via the keyboard 104.

Finally, the "Service Call" indicium 59 generates a request for service which, again, is sent via the computer 102 and the Internet or a communications network to an appropriate location. The service call preferably includes data such as the printer's make and model, the address at which the printer is located and its specific floor location at that address, and a code corresponding to the printer's self-diagnosed problem.

It will be appreciated that other appliances can have different indicium for correspondingly different purposes related to the specific needs thereof.

In addition, the printer 107 can be used to print smart cards with the control indicia and also program them with the mapping (and other) data, using the computer 102. In a particularly preferred embodiment, the controller 1 is able to download data from the computer 102 and write same into a smart card in the controller 1. Thus a user can create a smart card which is printed and written to automatically. For example, the control indicia can first be printed onto an upper face of the card, and then the mapping data can be downloaded from the computer 102 to the smart card. Alternatively an adhesive label can be printed and then adhered to the smart card.

Figure 14:
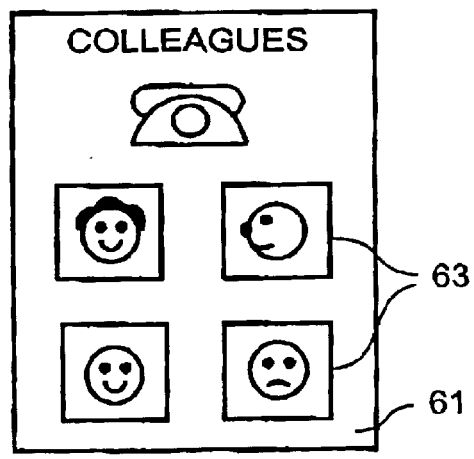
FIG. 14 is a control template for use with the apparatus shown in FIG. 13.

Turning to FIG. 13, there is shown the controller connected to a telephone 120 including a keypad 121. The controller 1 receives a smart card or a control template 61 designed for use as a personal address book. The control template 61 in this case is illustrated in FIG. 14 and includes a number of contact icons 63, each of which is linked to telephone, address, e-mail and other personal data associated with the person pictured in that icon. By inserting the control template 61 into a controller 1 associated with the telephone 120, selection of a given contact icon will enable communication with the corresponding person by dialling the corresponding telephone number. Where a number of telephone numbers, such as work, home and mobile telephone numbers, are available, selection of a contact icon 61 will cause a menu to be displayed on a visual display associated with the telephone 120, offering a choice of work, home or mobile calling. The user selects the desired option via the keypad 121, and the number is automatically called. Alternatively, if the computer 102 of FIG. 6 is being used, selection of the icon 63 will open an e-mail client program and insert the e-mail address of the intended recipient, thereby enabling the user simply to type in the e-mail message on the keyboard 104 and send it. As with previous embodiments, the contact data can be stored in or on the control template 61 itself, or can be remotely stored for access via, say, the Internet. Similarly, the mapping data linking the spatial extent of each icon can remotely be stored.

Figure 15:
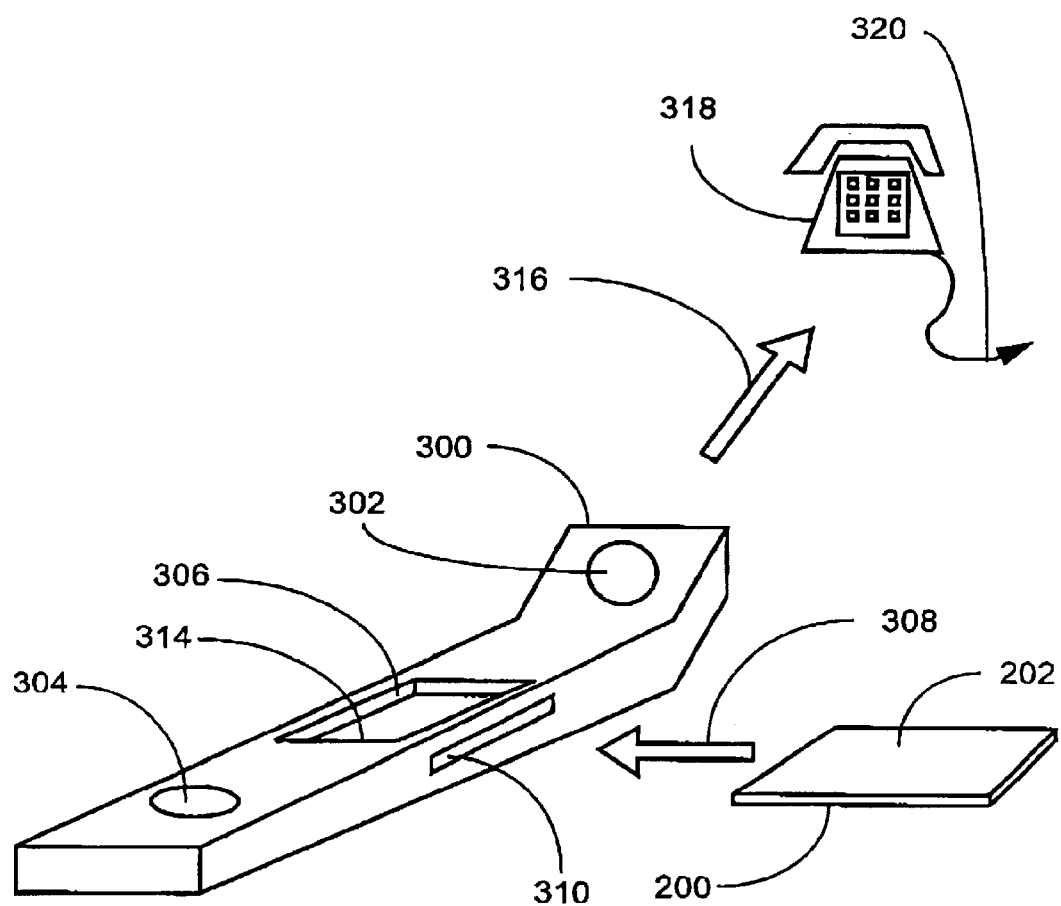
FIG. 15 represents a preferred embodiment of a cordless telephone adapted for use with a customised smart card.

FIG. 15 depicts a personal cordless telephone 300 which is able to be used in association with the smart card described in relation to FIG. 14. The telephone 300 incorporates a speaker 302, a microphone 304, and a recess 306 through which the upper surface 202 of a smart card 200 is able to be accessed by the user. The smart card 200 is inserted into the telephone 300 through a slot 310 as indicated by an arrow 308. Electrical contacts on the rear surface of the smart card 200 make electrical contact with corresponding electrical contacts 314 located in the recess 306 of the telephone 300. The cordless telephone 300 communicates by means of infrared, or alternatively radio, signals as depicted by arrow 316 with a telephone base station 318. The base station 318 is connected to the public switched telephone network (PSTN) (not shown) by means of a cord 320. A child, for example, can, by inserting the smart card 200 into the cordless telephone 300, have easy access by means of one-touch icons showing the face of a relevant person such as a mother, father and so on to each of those persons. The relevant telephone number is stored in the smart card 200 against the corresponding icon.

Figure 16:
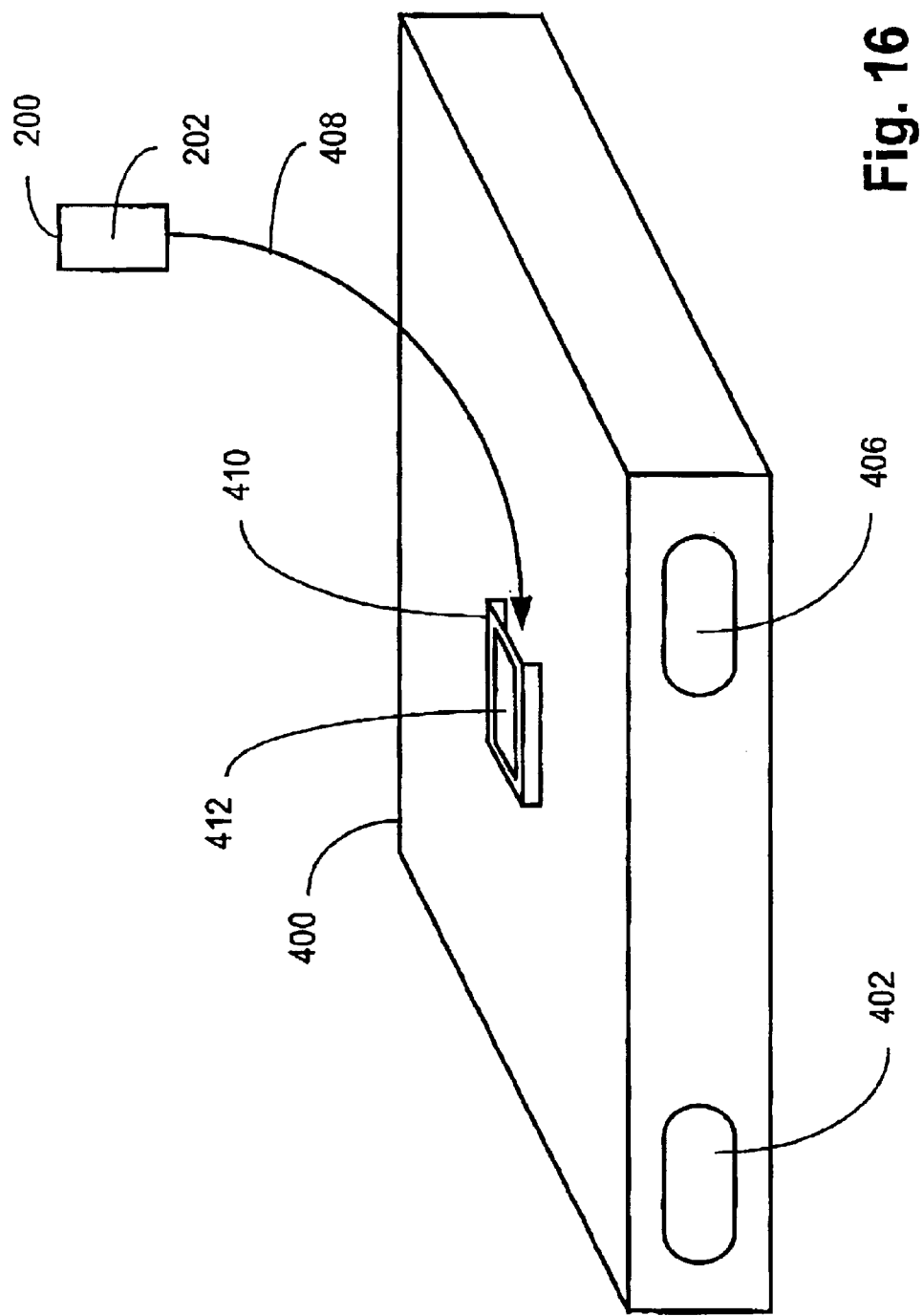
FIG. 16 depicts a preferred embodiment of a public telephone adapted for use with the aforementioned smart cards.

FIG. 16 presents an illustrative depiction of a public telephone 400 complete with a microphone 402 and a speaker 406. The public telephone 400 is not equipped with a normal keypad, however instead is fitted with a smart card receptacle 410. The smart card 200 can be inserted into the receptacle 410 as depicted by an arrow 408, thereby exposing the upper surface 202 of the smart card 200 through an aperture 412. When the child previously discussed inserts the smart card 200 as described into the telephone 400, the child has simple and uncomplicated access to the same important telephone numbers as was the case with the cordless telephone 300, which would be used in his home.

There is a problem which arises in relation to smart cards in that there is no "keyboard feedback" to the user. With a conventional keyboard, the movement of the pressed key provides the user with a generally reliable indication that the key has been effectively pressed. However, with a touch sensitive screen or capacitive sensing, there is no equivalent movement, Further, particularly in relation to smart cards where the user stimulated region operates an interface procedure, two additional problems arise. The first of these is that no change in a screen display, for example, may occur immediately following the successful "pressing" of an icon or region through a touch sensitive panel. This is because a computer processor may well be loading and/or executing instructions—giving rise to a substantial delay.

Secondly, pressing the same icon or region twice in succession often leads to a further, and different, set of instructions being issued. Thus if the user should press the touch sensitive panel twice in error, because the user (erroneously) thinks the first press was ineffective, then the consequences are far more damaging than during, say, typing, where the result is merely a given character being repeated twice. Particularly during electronic funds transfer, purchasing transactions, etc, every effort should be made to prevent the unintended set of second instructions being issued in error.

Figure 17:
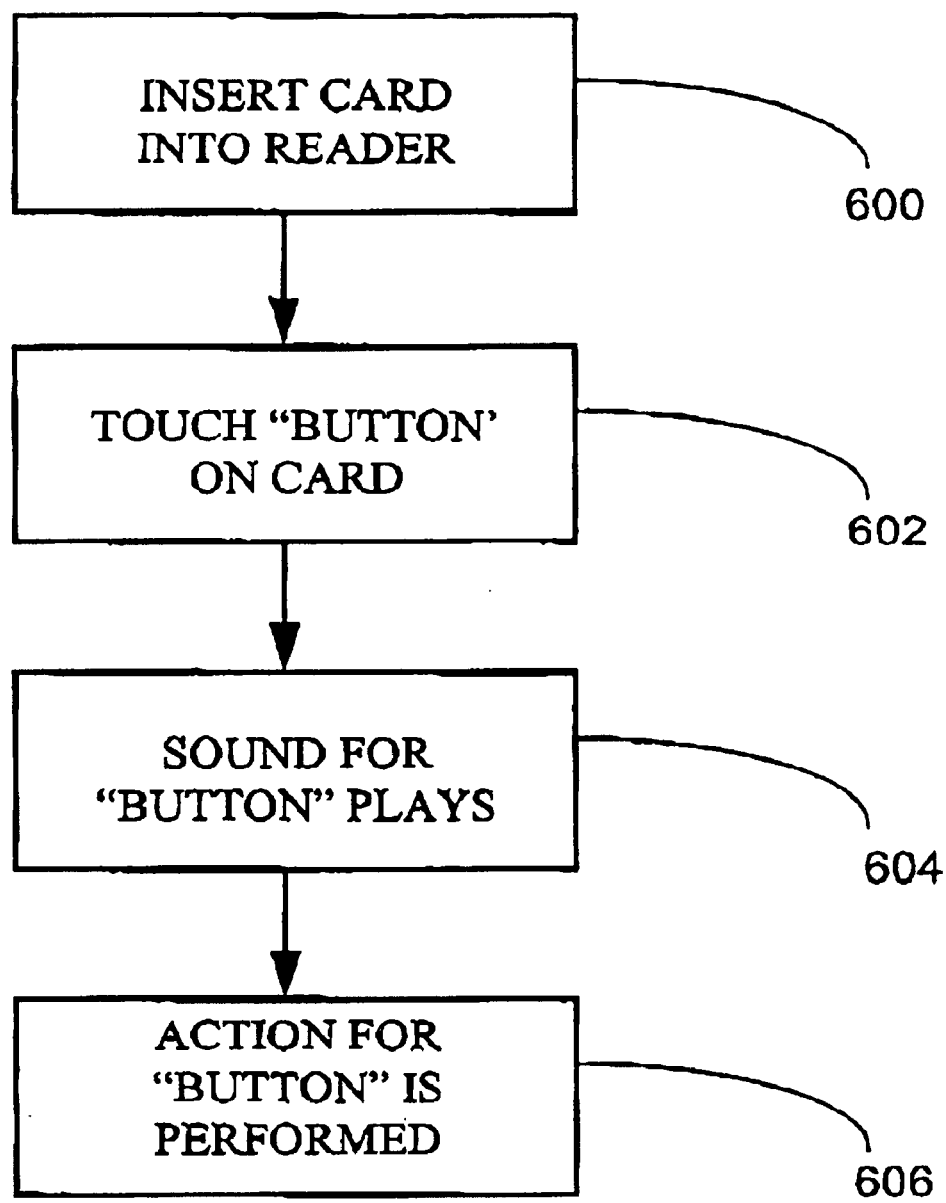
FIG. 17 presents a process flow diagram of a preferred embodiment from the user perspective.

FIG. 17 presents a process flow diagram for operation of a smart card user interface presented from a user perspective. A user inserts a smart card into an appropriate reader in process step 600, and touches a "button", or an "icon", or a "region" as described previously, at a designated position on the card in process step 602. In this instance, the smart card, and card reader are appropriately equipped so that the keystroke described in the process step 602 results in a sound being emitted (eg by the telephone speaker) in process step 604. The sound which is emitted is characteristic of the particular button which was pressed in the process step 602, and represents a form of feedback cue by which the user can verify that a particular icon or region has been pressed. Preferably, each button or icon has a different sound. For example, an icon which when activated results in a purchase can have a sound of coins falling down a chute, an icon which when activated results in opening a new program can have the sound of a squeaky door opening, etc. The process step 602 is optional and may be omitted if desired.

Finally, In step 606 an action associated with the particular icon or region being pressed is performed. Thus for example, having reference to the "telephone smart card" 200 described in relation to FIGS. 15 and 16, the sound emitted in process step 604 when the region 204 associated with the child's mother is pressed, might be a particular jingle associated with the child's mother, or alternatively, a synthesised voice output presenting the word "Mother" or "Mom". In this instance, the action associated with process step 606 is to establish a telephone call to the child's mother at the appropriate number associated with the aforementioned region 202.

Figure 18A:
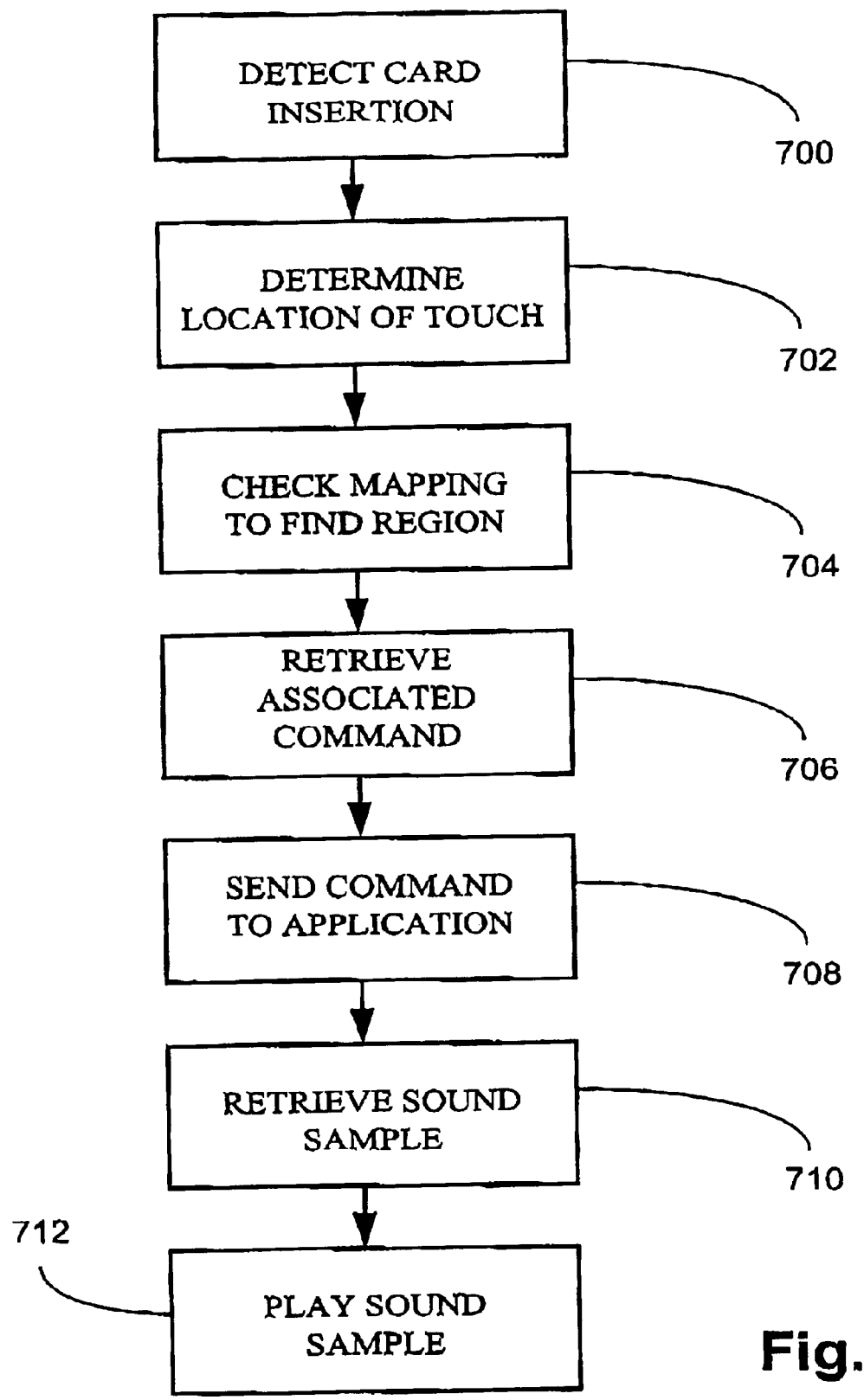
FIG. 18A presents a process flow diagram of a preferred embodiment from the card reader perspective.

FIG. 18A presents a process flow diagram from the perspective of the card reader into which a smart card as described is inserted. In a process step 700 the card insertion to the connector 406 is detected, whereafter in a process step 702, the card reader detects that the user has touched one of the designated regions with the Input Unit 404. In the initial detection step 700, the Processor 401 of the card reader 400 retrieves from the smart card memory, the name and address of the application associated with the card. In the following process step 704, the Processor 401 of the card reader 400 makes reference s to mapping information in order to identify the particular region pressed by the user, whereafter in step 706 the command associated with the particular region in question is retrieved from a memory 402. In a process step 708, the particular command being requested through touching the specified region is sent to the application in the device 201 in question. In the present case, and making reference to the child's telephone interface previously discussed, the command would be "to establish a telephone connection with the child's Mother", and the application in question would be a telephony communications application. In the following process step 710, the feedback sound associated with the particular region in question is retrieved whereafter it is played in step 712 to the user. The process steps 710 and 712 are optional and may be omitted if so desired.

The smart card as described has stored in its memory a list of x-y coordinates and commands associated with the "buttons", "icons", and/or "regions" of the smart card. For instance, each member of the list may have the syntax {TL,BR, "COMMAND"}, where TL and BR are the x-y coordinates of the top left hand corner and bottom right hand corner respectively of the associated "button", "icon" or "region" on the smart card, and where "COMMAND" is the associated command to be performed by pressing the associated "button", "icon", or "region". Some examples of "COMMAND" may be load URL address, or down load file etc. Preferably, the syntax allows multiple commands for each TL, BR coordinate. For instance, a member of the list may contain in addition to a command designated by the "button", a further command for retrieving and playing a particular sound sample for feedback to the user as previously described.

Figure 18B:
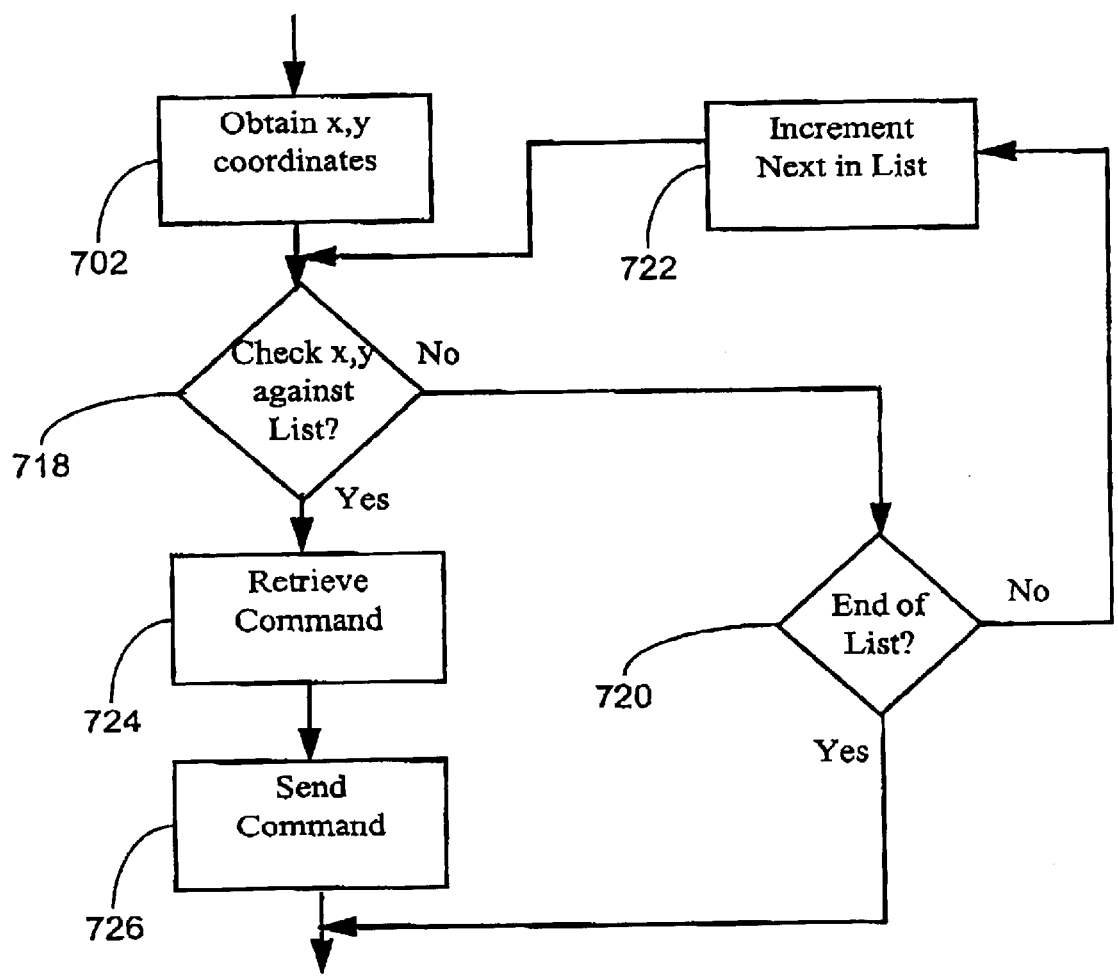
FIG. 18B presents in more detail a process flow diagram of steps 702 to 708 of the process shown in FIG. 18A.

Turning now to FIG. 18B, there is shown in more detail the processes of steps 702 to 712 of FIG. 18A. In a process step 702, the Processor 401 of the card reader 400 determines the x-y coordinates of the area on the smart card, which has been pressed with the Input Unit 404 by the user. The process then continues to decision block 718, where a check is made by the Processor 401 of the card reader 400 whether these pressed x-y coordinates match the coordinates TL, BR of a first member {TL, BR, "COMMAND"} of the list, which has been retrieved from memory in the smart card. If the x-y coordinates pressed with the Input Unit 404 by the user do not match to the coordinates TL, BR of the first member then the decision block 718 returns false (no) and the process continues to decision block 720. In decision block 720, a check is made whether the current member of the list is the last member of the list. If the decision block 720 returns false (no) then the process continues to process step 722, where the card reader increments to the next member of the list. Otherwise if the decision block 720 returns true (yes), the process then terminates awaiting further user input with the Input Unit 404. The card reader, thus increments through the list, checking the TL, BR coordinates of each member against the pressed x-y coordinates until a match is found. If no match is found the process terminates.

In the event the decision block 718 returns true (yes), that is if the pressed x-y coordinates match the TL, BR coordinates of a member {TL, BR, "COMMAND"} of the list, then the process continues to process step 724. Preferably, TL and BR define a region or area on the smart card and a match is found when the x-y coordinates of the area pressed with the input unit 404 by the user fall or partly fall within the region or area defined by TL and BR. In the next process step 724, the card reader retrieves the "COMMAND" associated with the matched coordinates and then sends 726 the "COMMAND" to the particular application in question. The card reader already knows the name and address of the application from the initial detection of the card. After step 726, the process then terminates awaiting further user input.

Figure 18C:
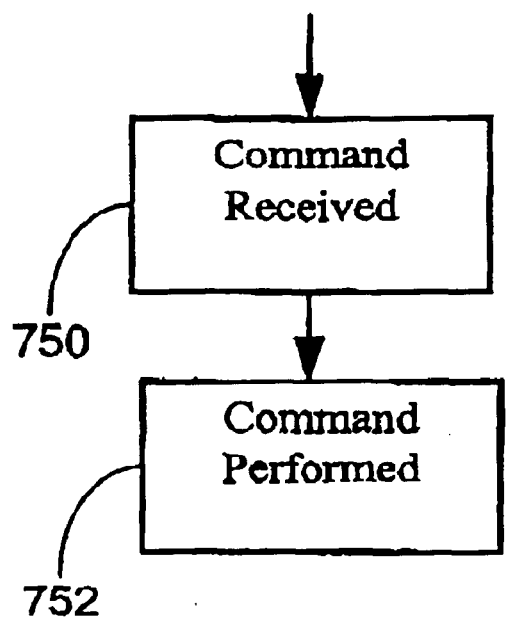
FIG. 18C presents a process flow diagram from the perspective of the application associated with a smart card as described.

FIG. 18C presents a process flow diagram from the perspective of the application associated with a smart card as described. There are many different configurations of applications suitable for use with the smart cards. For instance, the application can be located remotely on a server. Alternatively, it can also be located locally on a personal computer. The application can be a set top box, such as a VCR. Also, the application can either be implemented as software or hardware. For instance, the card reader may send a series of bits to a TV to remotely change the channels. Turning now to FIG. 18C, the process of the application is described. In a process step 750, the application receives a "COMMAND" from the card reader corresponding to the "icon", "button" or "region" on the smart card pressed by the user. The application in the next process step 752, performs the "COMMAND". For instance, the application can be an Internet browser and the command "load a URL address" In another example, the application can be a telephone communications package in a telephone and the command "Phone 999 9999".

Many business organisations nowadays have interactive voice response (IVR) systems. The calling party is effectively confronted with a computerised switchboard which progresses verbally through a menu and asks the caller to press various keys on his telephone keypad in order to progressively reach the caller's desired destination. The telephone requesting of an account balance from a financial institution is an example of this activity. Particularly where the same call is frequently made, the user being required to step through a menu of options prior to reaching an intended call destination, is particularly tiresome.

To alleviate this problem it is possible for the user to program his smart card with the desired series of telephone number, pauses, numerical menu responses, and account numbers and even passwords. This activating a single icon (labelled $ for example) can remove all the tiresome telephone key pressing and deliver the desired account balance in a single operation.

Figure 19:
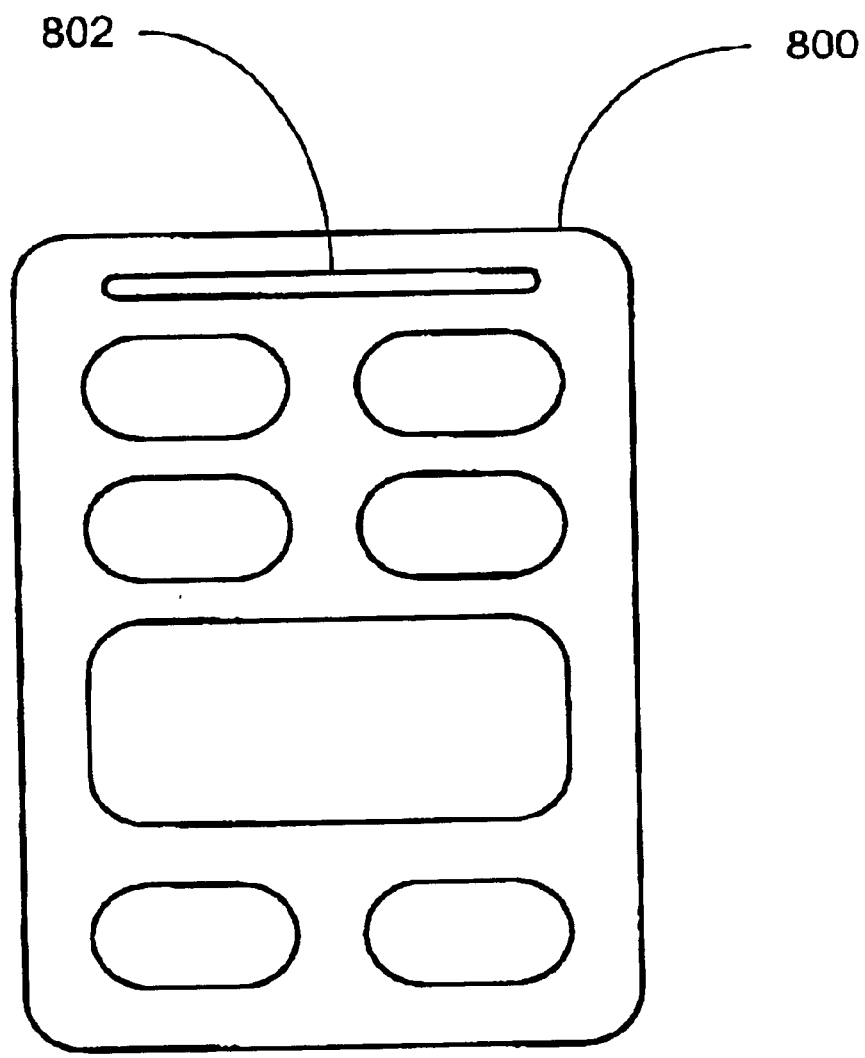
FIG. 19 depicts local visual feedback on the surface of a smart card.

FIG. 19 indicates how the feedback signal is able to be a visible feedback signal instead of being an audio signal as previously described in relation to FIGS. 16 and 17. A flashing light emitting diode (LED) 802 is located directly on the upper surface of a smart card 800. Alternatively, the LED 802 can be located on the cordless telephone 300 (see FIG. 15), or on the public telephone 400 (see FIG. 16).

Figure 20:
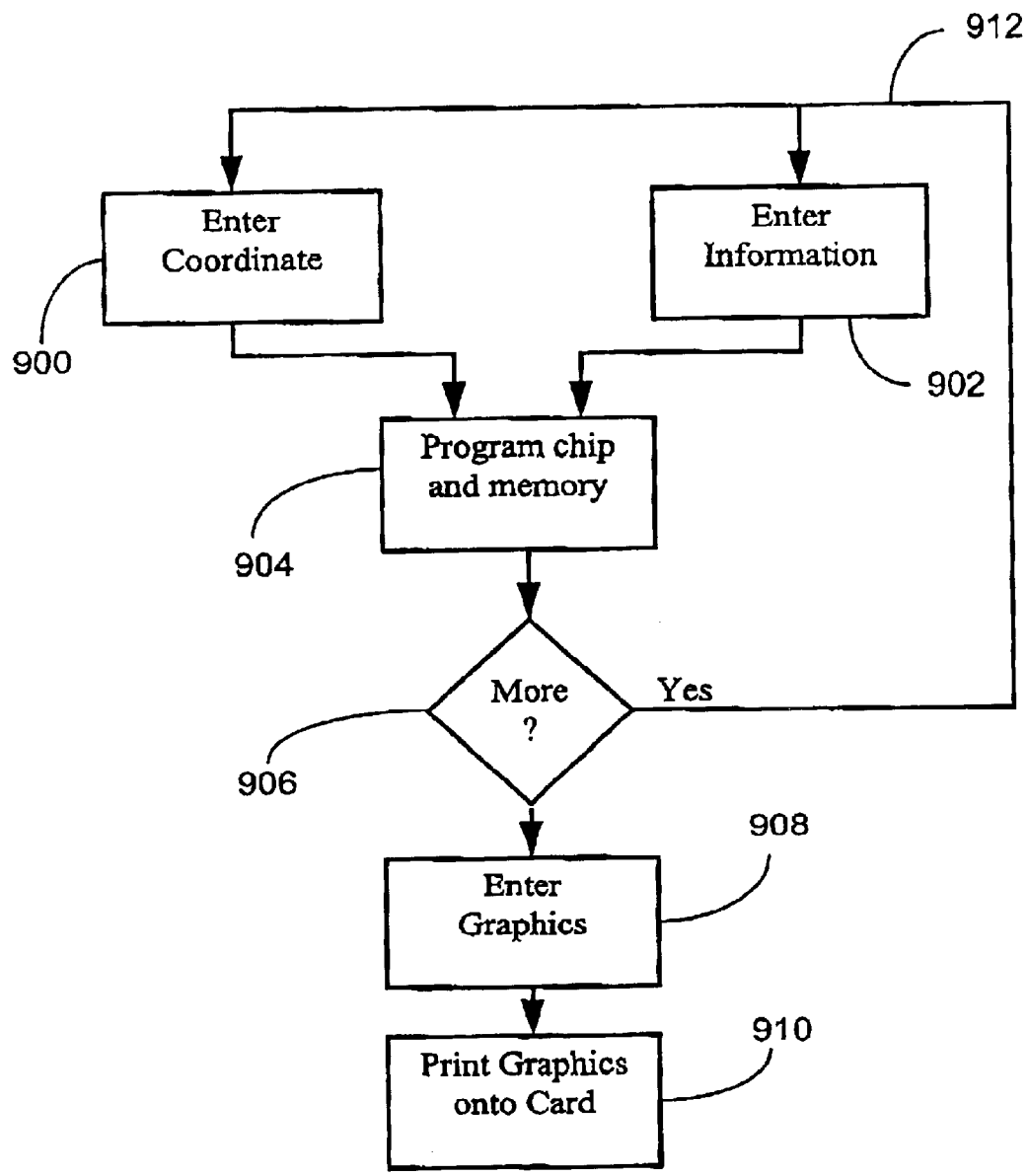
FIG. 20 presents a process flowchart for a preferred embodiment of a programming/printing apparatus.

Given the wide range of applications to which the programmable smart card interface is able to be applied, and the almost infinite range of data associated with the applications, a means of programming the required data into a smart card is required, and a process flowchart in this regard is presented in FIG. 20.

Turning to FIG. 38, there is shown a general-purpose computer 102, which is used for programming the smart card according to the process of FIG. 20. The smart card is programmed by means of a write device 215 coupled to an I/O interface 213 of the general-purpose computer 102. The write device 215 has the capability of writing data to the memory on the smart card. In addition, the write device 215 has the capability of printing graphics on the top surface of the smart card. The write device 215 can also have a function reading data from the memory on the smart card. Initially, the user inserts the smart card into the write device 215. The user then enters the required data via the keyboard 104 of the general-purpose computer 102 and a software application writes this data to the smart card memory via the write device 215.

Returning to FIG. 20, the programming process is now described. In process step 900 coordinates for a specified region is entered, while in parallel (or alternatively sequentially) information associated with the region in question is entered in process step 902. Again making reference to the child's telephone card 200, the coordinates of a button, icon or region are x-y coordinate measurements measured from convenient points, say a top left hand corner and bottom right corner of the card, while the command information associated with the button, icon or region is the telephone number for the child's mother at her place of work. Once both these pieces of information are entered via the keyboard 104, they are loaded by the software via write device 215 into the smart card memory in step 904. This information is stored in the smart card memory as a member of a list, eg {TL, BR, "COMMAND"} as previously described. Thereafter in step 906, the programming process tests whether further information is to be programmed onto the card. In the event that further information is required, the programming process is directed back to process step 900 and 902 as shown by arrow 912. In the event, however, that the programming is complete, the programming process is directed to a process step 908, where the programmer is able to select appropriate graphics from the software application, where the programmer is able to select appropriate graphics from the software application. These graphics are printed by means of the write device 215 onto the smart card upper surface. The write device 215 uses the x-y coordinate measurements entered by the user for printing the graphics at the appropriate locations. It is possible to make use of more complex graphics, and for example a miniature picture of the child's Mother can be printed on the card 200.

Figure 21:
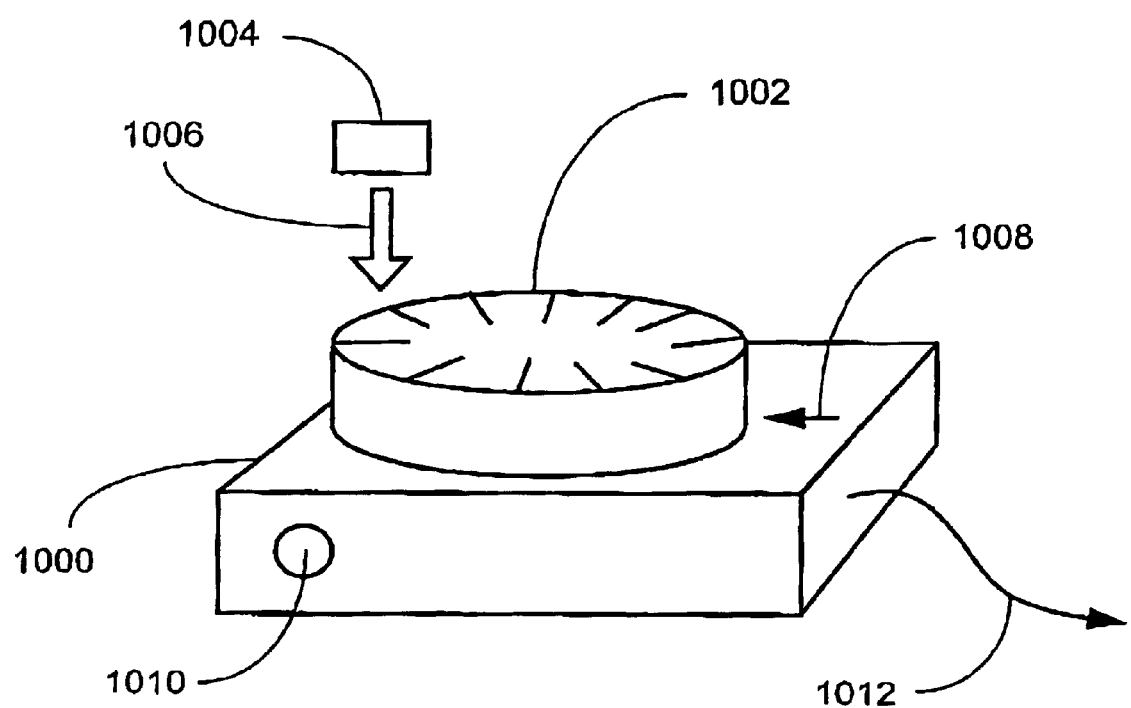
FIG. 21 depicts a preferred embodiment of an indexing apparatus for control of smart cards.

An issue which is likely to arise as use of programmable customer-interface smart cards increases, is that of systematic storage of the cards, and subsequent retrieval in a simple and efficient manner of the appropriate cards. One can image that over a period of time a person could accumulate hundreds of such cards for various applications, and an efficient and simple storage and retrieval mechanism would make their ongoing use more practical. FIG. 21 depicts a storage and retrieval apparatus 1000 which is equipped with a carousel 1002 into which individual smart cards 1004 are able to be inserted and stored in slots as depicted by an arrow 1006. The apparatus 1000 is connected by means of a cord 1012 to a computing device (not shown in FIG. 21 but the computer 102 of FIG. 6 for example). The slots in the carousel 1002 are equipped with suitable contact mechanisms so that when the smart cards 1004 are inserted, the information on the smart card 1004 is accessible to the computing device. When a user wishes to retrieve a particular smart card, say 1004, the user can enter an appropriate keyword, where upon the computing device controls the indexing apparatus 1000, rotating the carousel 1002 until the appropriate smart card, say 1004, is located immediately opposite an arrow 1008 embossed on the upper surface of the apparatus 1000. Keyword searches of this type are able to be based upon any information class stored on the smart cards, including names, company designations, and so on. Alternatively, the computing device is able to accumulate and store information on most frequently used smart cards, and enable the user to retrieve smart cards on this basis.

It will be appreciated by those skilled in the art that the card readers need not have a touch sensitive membrane and in the manner of card readers 1, 306 and 410. Instead other touch detecting arrangements are able to be used. One of these is a regular array of capacitor plates formed in the base of the card reader or receptacle. Since the card is essentially an insulator, the capacitors can sense the approach of the tip of the human finger since the self capacitance of the finger tip disturbs the charge on the opposite capacitor.

Alternatively, the rear face of the smart card can be printed with conductive ink into a series of pads all set out in a regular array with each paid connected by a corresponding thin connector to a corresponding electrical contact. Again, the approach of a human finger tip against the front face of the smart card causes a change in charge at the electrode corresponding to the pad opposite the point of approach.

Thus, as seen in FIGS. 22–25, the smart card can have an upper surface which is not smooth. Thus in FIG. 22 the substrate 62 can be provided with an embossed upper face 66 having a plurality of raised areas 68. These provide the user with tactile feedback. If desired, as indicated in FIGS. 24 and 25, the embossed upper face 66 can be provided with Braille characters 70. However, as the number of persons who know Braille is relatively small, this limits the commercial application of this type of indicia.

However, in many commercial applications it is disadvantageous to be required to read the smart card indicia since this slows down the desired operation. For example, in browsing through a long sequence of images, only some of which are to be printed for subsequent investigation, the viewer activates either a "print" indicium or a "next" indicium depending on whether the particular image being displayed is to be printed or whether the next image in the sequence is to be displayed instead. Naturally, if it is necessary for the viewer on each occasion to look down onto the smart card itself before being able to ascertain which indicium to select, this very substantially slows the rapidity with which the viewer can view all the images in the sequence.

A similar situation arises where viewing is occurring in darkened circumstances, for example whilst watching TV, and the viewer wishes to change channels. Under these circumstances it is very disruptive to increase the level of illumination to a point where indicia on the smart card can be read to identify the required indicium to be pressed to select the desired channel.

Other scenarios will arise such as that where the operator may have good long distance sight for viewing a screen, but poor short distance sight required to view the indicia on the smart card.

Figure 26:
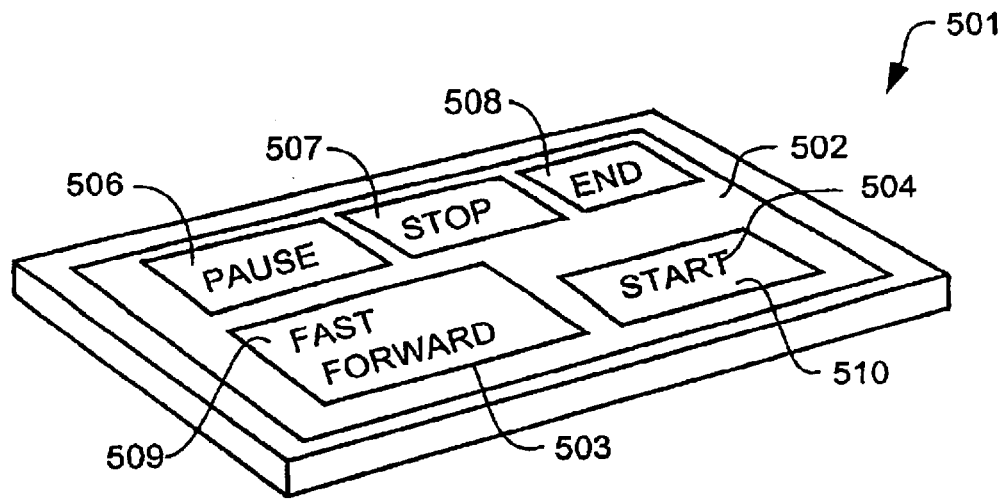
FIG. 26 is a perspective view of a prior art smart card.

As seen in FIG. 26, a prior art smart card 501 is provided with an upper surface. Marked on the upper surface 502 are various boundaries 503 which indicate the locations of operations able to be performed by the smart card 501 and indicia 504 in the form of text which indicates the function of each of the various operations. The boundaries 503 and indicia 504 are created by printing in a conventional manner. In the particular smart card illustrated in FIG. 26 there are five functions as follows: PAUSE 506, STOP 507, END 508, FAST FORWARD 509 and START 510.

It will be apparent that the arrangement of FIG. 26 suffers from the disadvantages referred to above if it is required to be used in the dark, if the user is long-sighted, if the user wishes not to divert his attention from a computer screen, and the like.

Figure 27:
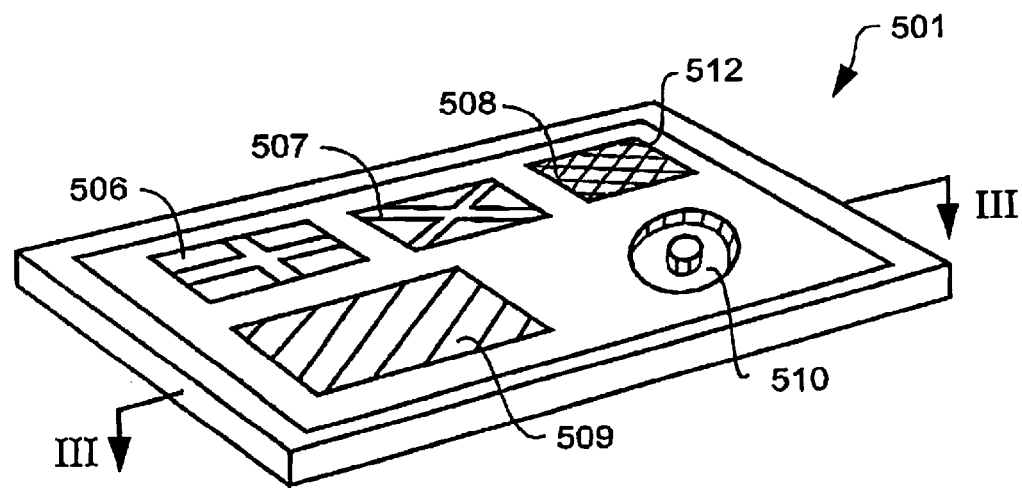
FIG. 27 is a similar view but of the smart card of another embodiment of the present invention.
Figure 28:
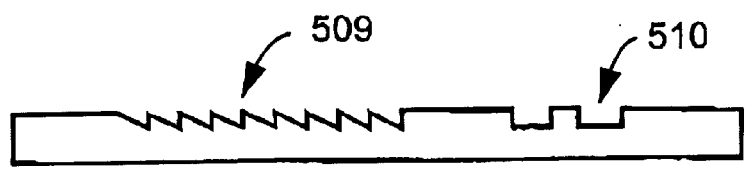
FIG. 28 is a transverse cross-sectional view along the line III—III of FIG. 27.

In accordance with a preferred embodiment of the present invention, as schematically illustrated in FIG. 27, the boundaries 503 and indicia 504 are each replaced by an area 512 which has a unique tactile characteristic. Thus the PAUSE indicium 6 is replaced by a Cross of St George, the STOP indicium 507 is replaced by a Cross of St Andrew, the END indicium 508 is replaced by an area of cross-hatch grooving, the FAST FORWARD indicium 509 is replaced by an area of diagonal grooving, and the START indicium 510 is replaced by an annular area of lower elevation having a central pillar of original elevation. The nature of the tactile indicia are clearly illustrated in FIG. 28 where the regions are seen in exaggerated cross-section.

It will be apparent that each of the areas 512 in FIG. 27 is able to be distinguished by touch by the user and therefore in order to operate the smart card 501 it is not necessary for the smart card 501 to be illuminate, or for the user to divert his attention from some other object such as a screen which the smart card controls.

Figure 29:
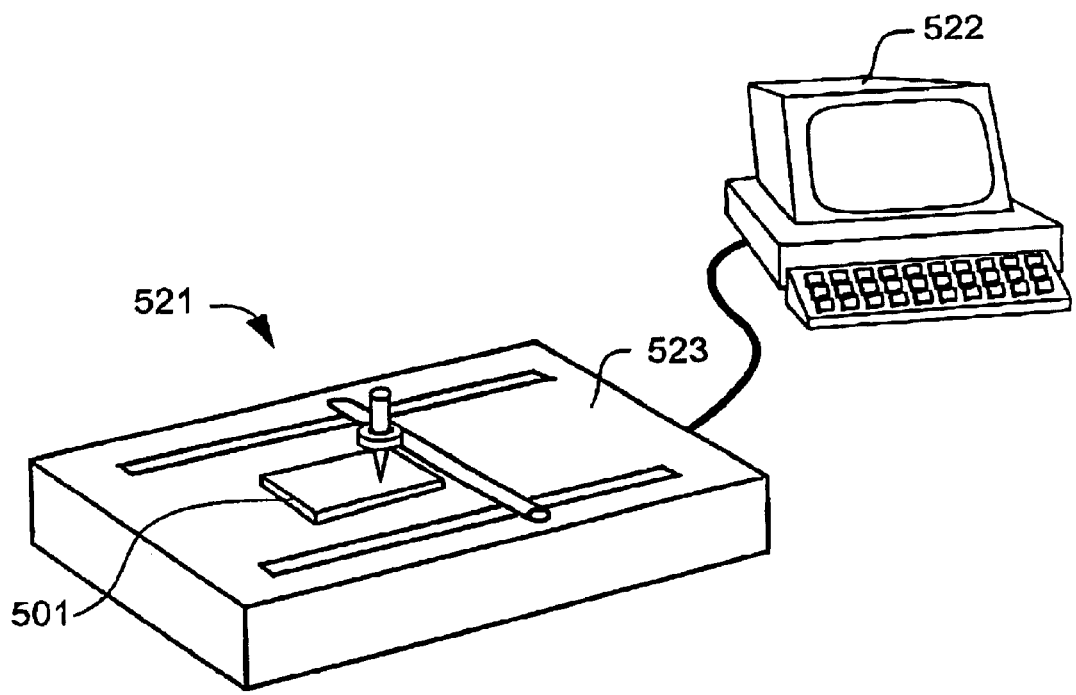
FIG. 29 illustrates a substantially conventional cutting plotter operated by computer software.

Turning now to FIG. 29, a computer driven cutting plotter 521, known per se and its controlling computer 522 are illustrated. The user of the smart card 501 places the smart card on the cutting table 523 and the computer 522 is loaded with data to indicate the position of the machined areas 512 and the nature of the machining. Thereafter, the machining can be carried out by the cutting plotter 521 so as to create the necessary machined areas 512.

In this way the user is able to determine for himself what type of tactile characteristic the user wishes to represent each function. That is to say the user determines that the pause indicium is to be represented by the Cross of St. George, and not, say, by a Maltese Cross. As a consequence, the user can carry out the operations by touch and memory without the necessity to read any indicia. This provides an important distinction between the described arrangement and, for example, Braille where it is necessary for the user to effectively learn an alphabet based on positions of dots (essentially a code) prior to being able to read Braille.

It is not necessary for the tactile characteristic to be formed by cutting as indicated in FIG. 29. Instead the printing technique of thermography can be used. This process produces a raised image by means of a resin "ink" which is printed onto a surface and then "baked". During the baking the resin expands to produce a raised surface. Many business cards use this process to create an expensive appearance.

Figure 30:
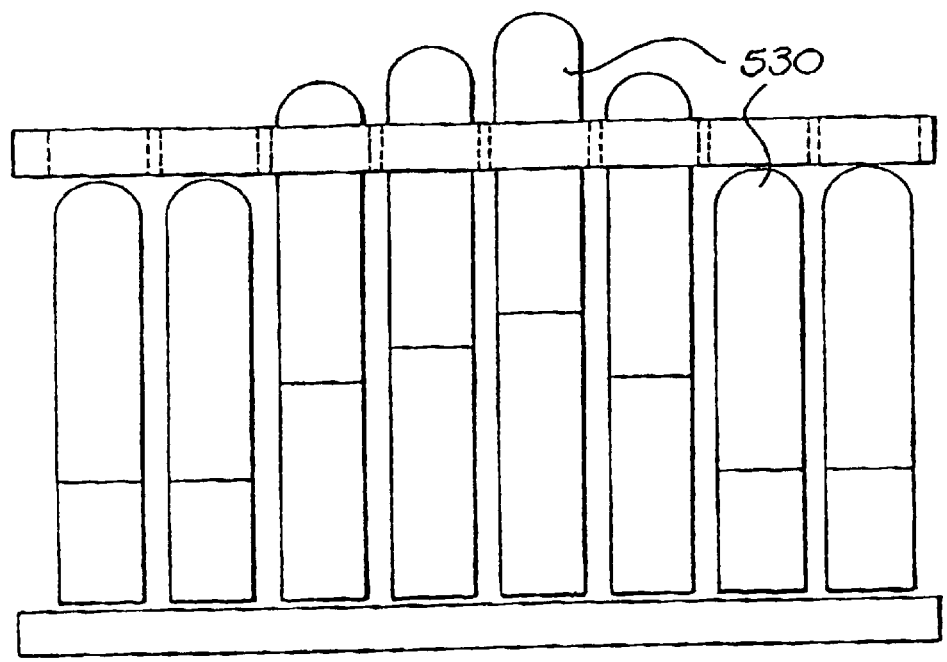
FIG. 30 is a side elevation of embossing pins.
Figure 31:
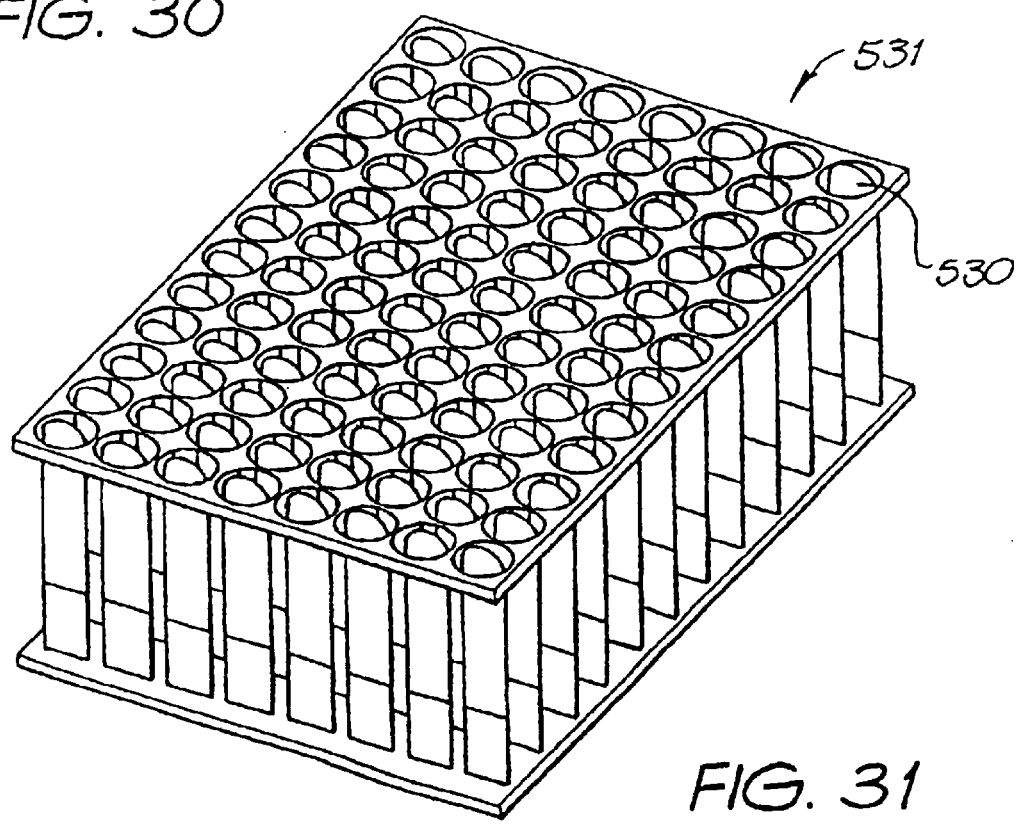
FIG. 31 is a perspective view from above of an array of the embossing pins of FIG. 30.

Another printing process which creates a raised surface is embossing. This can be done using pins 530 set out in dot matrix fashion with high resolution as schematically illustrated in FIGS. 30 and 31. The array 531 of pins illustrated in FIG. 36 would print part of, or all of, a single letter, for example. The pins 530 can be operated under computer control and thereby raised to permanently deform, or emboss, a sheet which is to form the upper surface of the smart card (66 for example). Such an embossed paper sheet can be glued to the upper surface of a substrate 62 as illustrated in FIG. 22.

Irrespective of the process used to create the tactile characteristic, the ability of the user to select his own tactile characteristics to suit the function he has programmed into his own smart card creates a user versatility which is highly thought of by many users.

As the mapping data takes the form of coordinate information corresponding with the various indicia, where an indicium is irregularly shaped (such as the St Andrews cross or a Maltese cross), a rectangular or other shaped bounding box can be used to reduce the amount of mapping required. Such a bounding box need not fully bound the particular indicium, and can be wholly or partially contained therein, depending upon the available space.

Turning now to FIGS. 32–37, it will be appreciated that the smart card technology of the present invention is applicable to Automatic Teller Machines (ATMs). In particular, the controller 1 of FIGS. 1 and 6 is equally applicable as a built-in card reader for an ATM. The functionality of the ATM can be substantially increased by the ability to render substantially opaque portions of the screen visible to the user. In this way the user's attention is concentrated only to those "keys", indicia or regions which are applicable choices at the relevant stage of the transaction.

Figure 32:
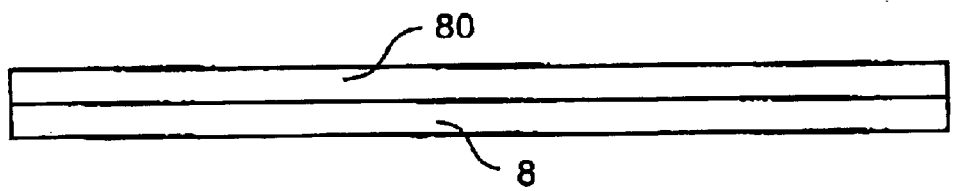
FIG. 32 is a longitudinal cross-sectional view of a pressure sensitive membrane and associated LCD layer for use with a preferred embodiment.

As shown in FIG. 32, a substantially transparent liquid crystal display (LCD) 80 overlies the pressure sensitive membrane 8, such that a user can still see through both layers. In this embodiment, described in FIGS. 32–37 the control template takes the form of a smart card 82 (FIG. 37) having on-board data storage means (not shown but similar to chip 19 of FIG. 3)) in the form of non-volatile memory. As with previous smart card embodiments, contacts (not shown but similar to contacts 18 of FIG. 3) are also provided to allow the smart card 82 to communicate mapping data from the storage means to the associated controller, which in this case is an Automatic Teller Machine.

The LCD layer 80 is an array of liquid crystal cells, each of which can selectively be turned "on" or "off". When a cell is "on", it allows substantially no light to pass and is therefore effectively opaque. When turned "off", the cell is substantially transparent to visible light. In other embodiments, the LCD layer 80 can be replaced by any form of display which is relatively thin and substantially transparent. Accordingly, thin film transistor (TFT) displays and the like, whether monochrome or colour, can be used without departing from the spirit and scope of the invention. Similarly, the display 80 can be placed above or below the pressure sensitive membrane 8, depending upon the preferred implementation and manufacturing considerations.

Figure 33:
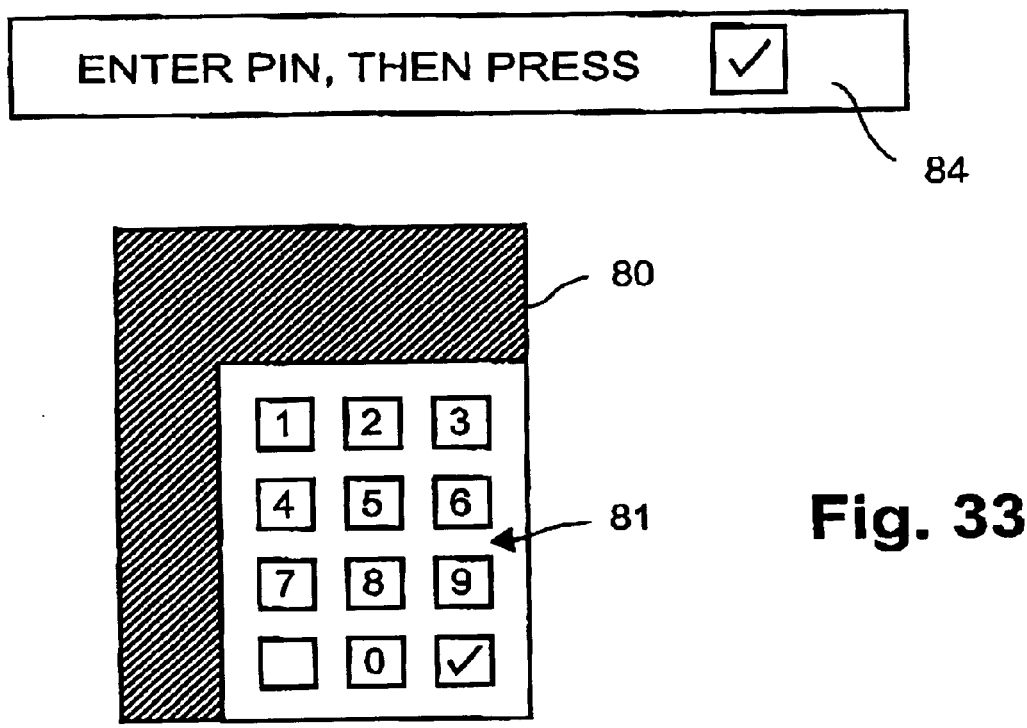
FIGS. 33 to 37 show various stages in the use of a control template with the arrangement shown in FIG. 32.

In use, the smart card 82 is inserted into a suitable receptacle associated with the ATM. Once the smart card 82 is in position, the LCD 80 is activated to block out all but the keypad 81 and confirm buttons, as shown in FIG. 33. An associated screen 84 tells the user that the ATM is expecting a personal identification number (PIN) to be entered, followed by the "confirm" button (represented by a "tick"). Once the user enters the required pin and presses confirm, the LCD 80 is changed to the configuration shown in FIG. 17, wherein the "transfer" button 86, "account balance" button 88 and "withdraw" button 90 are displayed. The screen 84 prompts the user to select a desired action. In this case, the user selects withdraw button 90.

Figure 35:
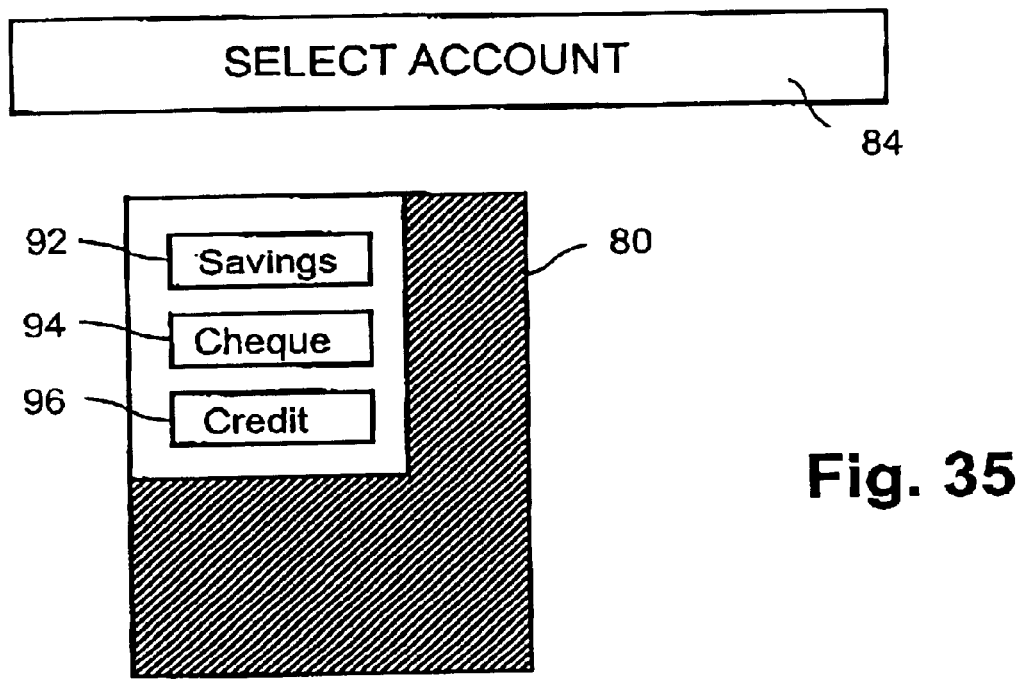

Once withdraw button 90 has been selected, the LCD layer 80 changes again, to provide the configuration shown in FIG. 35. The three buttons displayed are the "savings" button 92, "cheque" button 94 and "credit" button 96, and the screen 84 prompts the user to select an account. In this case, the user elects to withdraw money from the savings account and does so by pressing the "savings" button 92. Once the account has been selected, the LCD 80 is again reconfigured to that shown in FIG. 33 for the user to enter the amount to be withdrawn. In this case, the screen 84 prompts the user to enter the amount of money required to be withdrawn (not illustrated in FIG. 33).

Figure 36:
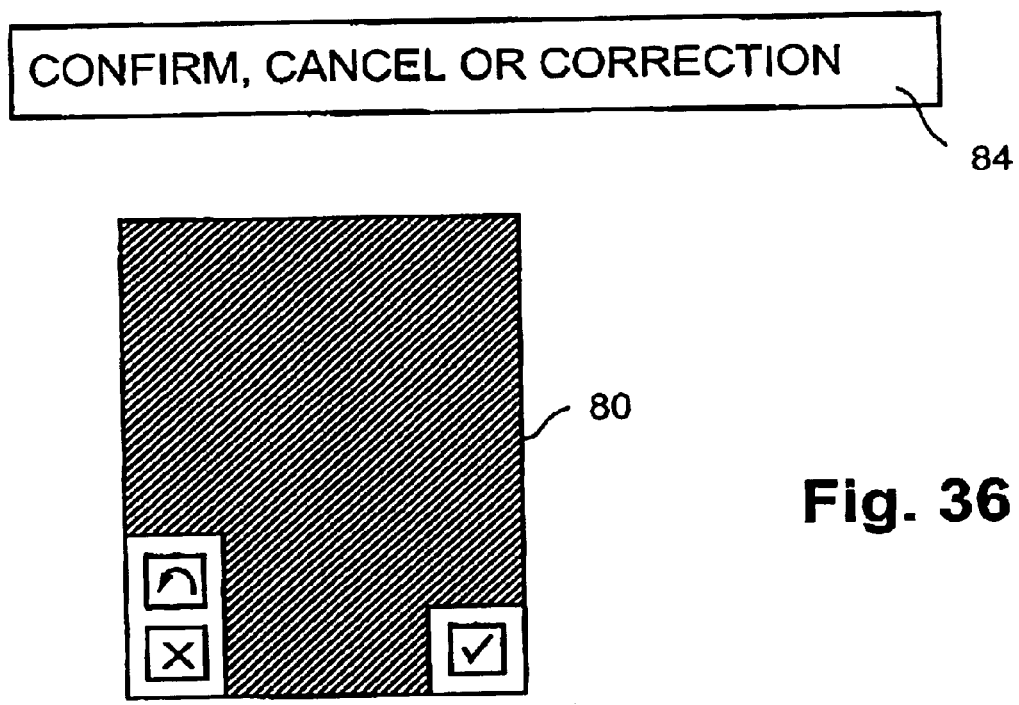

Once the user has entered the required amount and pressed confirm, the configuration of the LCD 80 is again changed to that shown in FIG. 36. The screen 84 prompts the user to confirm, cancel or withdraw. If the user presses cancel (the "X" button), the transaction is ended and the card 82 can be removed from the receptacle. If "correction" is selected, the LCD layer 80 will return to the previous configuration, allowing the user to enter the correct amount to be withdrawn.

Once the confirm button has been entered, the ATM processes the requested transaction, and issues the required money through the conventional cash dispenser (not shown).

It will be appreciated that this embodiment can be applied to any situation in which a number of sequential steps need to be taken to complete a transaction. At each step, the LCD is configured to allow access only to available options, whilst blocking unavailable options, A number of modifications of this embodiment are also available. For example, in one alternative embodiment, the LCD layer 80 can be configured to emphasise one or more available indicia, on the basis that those indicia are the most likely to be of interest to a user at a current stage of a transaction.

The emphasis can take any suitable form, including the use of a bounding box, flashing indicators or even animated arrows pointing to an emphasised indicium. In other embodiments, the LCD layer 80 provides other graphics images, including advertising or instructions such as those shown on screen 84. In one embodiment, one or more of the indicia is captioned with text or some other symbol to explain its purpose. For example, if a beetle image is used as a "play" button, as described in an embodiment above, the word "play" can be positioned over or adjacent the beetle by means of the LCD layer 80. It will be appreciated that the area surrounding the beetle needs to be of an appropriate is colour to enable the LCD text to be visible. However, the background colour can also be included as part of the mapping data, thereby enabling the embodiment to only display text where it will be visible. In the case of a colour LCD layer 80 or other display medium, suitable contrasting colours can be selected on the basis of the background colour, or even of the indicia themselves.

Figure 37:
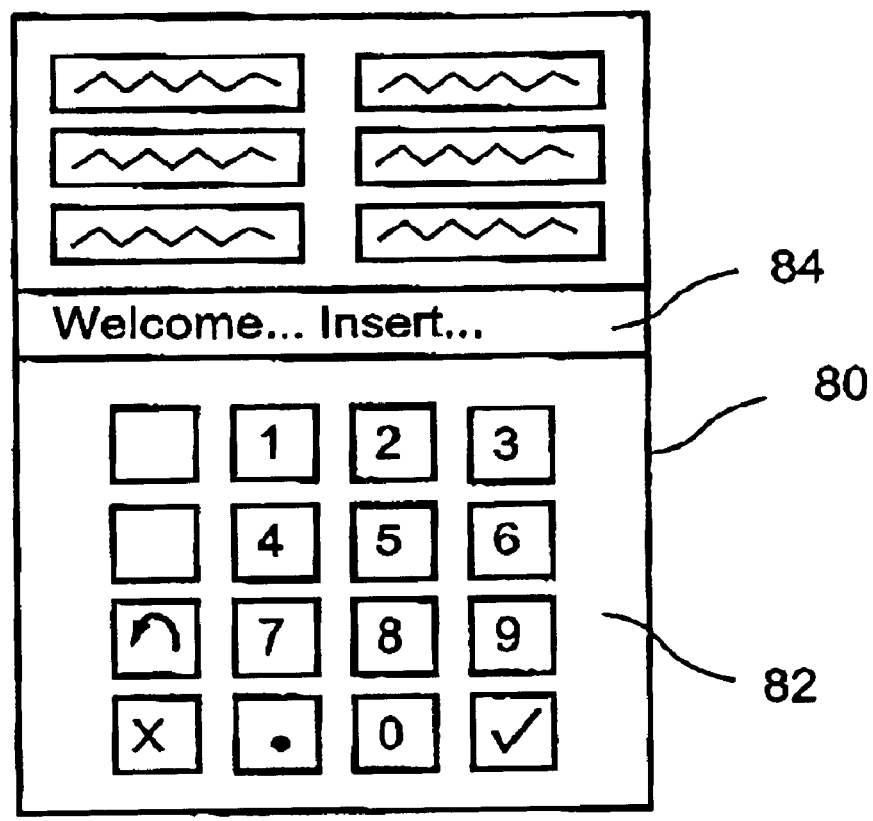

Another alternative embodiment is shown in FIG. 37, in which the screen 84 is superimposed over a relatively blank area of the smart card 82. The various messages are displayed by means of the LCD layer 80, and be scrolled across the smart card 82 when the message is too long to be displayed at once.

The embodiments above have been concerned mainly with the use of a pressure sensitive membrane positioned in a viewing area of a controller. However, it will be appreciated that any other form of sensing means capable of providing an indication of a user's selection can also be used. Non-limiting examples of these include capacitive or ultrasonic sensors, laser tracking systems, heat sensors or chemical detectors. It will also be appreciated that, where a pressure sensitive membrane is used, the pressure sensitivity can either be interpreted as a simple binary threshold, or as a multi-level or even substantially continuous pressure input. In one embodiment, the software which drives the pressure sensitive membrane allows a user to slide a finger across the surface of the membrane to indicate an increase or decrease in a value. For example, if a user drags a finger across the pressure sensitive membrane from left to right, this can be interpreted as an increase in, say, volume for a television remote control.

The methods of FIGS. 18C and 20 are preferably practised using a conventional general-purpose computer system 102 the exterior of which is illustrated in FIG. 6 and the interior of which is illustrated in FIG. 38. The processes of FIGS. 18C and 20 are able to be implemented as software, such as an application program executing within the computer system 102. In particular, the steps of the methods of FIGS. 18C and 20 are effected by instructions in the software that are carried out by the computer 102. The software is able to be divided into two separate parts; one part for carrying out the methods; and another part to manage the user interface between the latter and the user. the software is able to be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for carrying out the embodiments of the invention.

The computer system 102 takes the form of a computer module 201, input devices such as a keyboard 104 and mouse 203, output devices including the printer 107 and the display device 101. A Modulator-Demodulator (Modem) transceiver device 216 is used by the computer module for communicating to and from a communications network 220, for example connectable via a telephone line 221 or other functional medium. The modem 216 can be used to obtain access to the Internet, and other network systems, such as a Local Area Network (LAN) or a Wide Area Network (WAN).

The computer module 201 typically includes at least one processor unit 205, a memory unit 206, for example formed from semiconductor random access memory (RAM) and read only memory (ROM), input/output (I/O) interfaces including a video interface 207, and an I/O interface 213 for the keyboard 104 and mouse 203, a write device 215, and an interface 208 for the modem 216. A storage device 209 is provided and typically includes a hard disk drive 210 and a floppy disk drive 211. A magnetic tape drive (not illustrated) is also able to be used. A CD-ROM drive 212 is typically provided as a non-volatile source of data. The components 205 to 213 of the computer module 201, typically communicate via an interconnected bus 204 and in a manner which results in a conventional mode of operation of the computer system 102 known to those in the relevant art. Examples of computers on which the embodiments can be practised include IBM-PCs and compatibles, Sun Sparcstations or alike computer system evolved therefrom.

Typically, the application program of the preferred embodiment is resident on the hard disk drive 210 and read and controlled in its execution by the processor 205. Intermediate storage of the program and any data fetched from the network 220 may be accomplished using the semiconductor memory 206, possibly in concert with the hard disk drive 210, In some instances, the application program will be supplied to the user encoded on a CD-ROM or floppy disk and read via the corresponding drive 212 or 211, or alternatively may be read by the user from the network 220 via the modem device 216. Still further, the software can also be loaded into the computer system 102 from other compute readable medium including magnetic tape, a ROM or integrated circuit, a magneto-optical disk, a radio or infra-red transmission channel between the computer module 210 and another device, a computer readable card such as a smart card, a PCMCIA card, and the Internet and Intranets including email transmissions and information recorded on websites and the like. The foregoing is merely exemplary of relevant computer readable media. Other computer readable media are able to be practised without departing from the scope and spirit of the invention, The method of FIG. 18C is alternatively able to be implemented in dedicated hardware as one or more integrated circuits performing the described functions or sub-functions. Such dedicated hardware is able to include graphic processors, digital signal processors, or one or more microprocessors and associated memories. Examples of such dedicated hardware include a set top box for a television.

INDUSTRIAL APPLICABILITY

It is apparent from the above that the embodiment(s) of the invention are applicable to the computer and data processing industries and the telecommunications industries.

The foregoing describes only some embodiments of the present invention, and modifications and/or changes can be made thereto without departing from the scope of the invention.

What is claimed is:

1. A customisable user interface system comprising:
a card comprising a substrate, a memory device associated therewith, and indicia formed on said substrate and user interpretable to relate to functions stored within said memory; wherein mapping data is stored within said memory device, said mapping data defining, in relation to each indicium, a bounding box delineating a mapped position of said indicium on the substrate; and
a reader device for said card comprising a touch sensitive device arranged to overlay an inserted said card and through which said indicia are visible, characterised in that (a) said touch sensitive device comprises a membrane via which said indicia may be selected, the membrane being responsive to a touch applied anywhere on the membrane, said membrane providing, in response to said touch, touch coordinates corresponding to a location of the touch on the membrane, and (b) the indicia are arranged on the card independently of where the touch can be applied to the membrane, wherein generation of touch coordinates falling within said bounding box establishes selection of said indicium.

2. A customisable user interface system according to claim 1, wherein said card stores a command and memory address associated with a user selected one of said indicia in said memory device, said command and memory address being used to down-load specific image data to a user display over a network from an image store that is located remotely from the user.

3. A customizable user interface system according to claim 1, wherein
said card stores a command and memory address associated with a user selected one of said indicia in said memory device, said command and memory address being used to read a specific image data to a user display from an image store that is located in proximity to the user.

4. A customizable user interface system according to claim 1, wherein
said reader device reads a command and memory address associated with a user selected one of said indicia from said card and outputs said command and memory address to an external device having an image store that is located remotely from the user to display a specific image on a display.

5. A customizable user interface system according to claim 1, wherein
said reader device reads a command and memory address associated with a user selected one of said indicia from said card and outputs said command and memory address to an external device having an image store that is located in proximity to the user to display a specific image on a display.

6. A control template for a user interface system, said template being adapted for use with a reader device including a touch sensitive membrane responsive to a touch applied anywhere on the membrane, said membrane providing, in response to said touch, touch coordinates corresponding to a location of the touch on the membrane, the membrane being arranged to overlay the template when the template is coupled to the reader device the template comprising:
an electronic card formed of a substrate having associated therewith a memory device;
a plurality of indicia on said substrate the indicia being arranged on the substrate independently of where the touch can be applied to the membrane; and
mapping data stored within said memory device said mapping data defining, in relation to each indicia, a bounding box delineating the mapped position of each indicium on the substrate, wherein generation of touch coordinates falling within said bounding box establishes selection of said indicium.

7. A control template according to claim 6, wherein said card stores a command and memory address associated with a user selected one of said indicia in said memory device, said command and memory address being used to download specific image data to a user display over a network from an image store that is located remotely from the user.

8. A control template according to claim 6, wherein said card stores a
command and memory address associated with a user selected one of said indicia in said memory device, said command and memory address being used to read a specific image data to the user display from an image store that is located in proximity to a user.

9. A read device for a control template interface card having indicia on a surface thereof, said device comprising:
a substantially transparent touch sensitive membrane arranged to overlay said interface card the membrane being responsive to a touch applied anywhere on the membrane, said membrane providing, in response to said touch, touch coordinates corresponding to a location of the touch on the membrane, said touch being directed to a selected one of the indicia; and
means for reading a memory device formed in said interface card in response to said user's touch on said membrane,
wherein the indicia are arranged on the card independently of where the touch can be applied to the membrane; and wherein mapping data is stored within said memory device, said mapping data defining, in relation to each indicium, a bounding box delineating a mapped position of an indicium on the substrate, and wherein generation of touch coordinates falling within said bounding box establishes selection of said indicium.

10. A reader device according to claim 9, wherein said reading means
reads a command and memory address associated with a user selected one of said indicia from said card and outputs said command and memory address to an external device having an image store that is located remotely from the user to display a specific image on a display.

11. A customizable user interface system according to claim 9, wherein
said reading means reads a command and memory address associated with a user selected one of said indicia from said card and outputs said command and memory address to an external device having an image store that is located in proximity to the user to display a specific image on a display.

12. A smart card to be inserted into a card reader that communicates with a computer device, the card reader comprising a touch sensitive membrane arranged to overlay an inserted said smart card and through which indicia on the inserted card are visible, the membrane being responsive to a touch applied anywhere on the membrane, said membrane providing, in response to said touch, touch coordinates corresponding to a location of the touch on the membrane, said smart card comprising:
a memory for storing a command and an address that is pointing to a remote location in a second computer device at which information is stored, wherein the information is accessed via a communication line between the computer device and the second computer device,
wherein one of the indicia on said card is associated with said command, the indicia being arranged on the card independently of where the touch can be applied to the membrane; and wherein mapping data is stored within said smart card memory, said mapping data defining, in relation to an indicium, a bounding box delineating a mapped position of said indicium on the smart card, and wherein generation of touch coordinates falling within said bounding box establishes selection of said indicium.

13. A smart card according to claim 12, wherein the information is an application that is located on said second computer device.

14. A smart card according to claim 12, wherein the information is accessed via the communication line when a user selects an indicium on the card.

15. A smart card according to claim 12, wherein the access is carried out by sending a command from the card reader to the second computer device via the computer device.

16. A smart card according to claim 15, wherein the command is sent to said second computer by selecting said indicium.

17. A smart card according to claim 12, wherein the information is loaded from said second computer device to said computer device.

18. A computer device for communicating with a card reader comprising a touch sensitive membrane arranged to overlay an inserted smart card and through which indicia on a surface of the inserted smart card are visible, the membrane being responsive to a touch applied anywhere on the membrane, said membrane providing, in response to said touch, touch coordinates corresponding to a location of the touch on the membrane, the indicia being arranged on the card independently of where the touch can be applied to the membrane, said computer device comprising:
a processor for receiving a command from the card reader that receives said card that stores said command and an address that is pointing to a remote location in a second computer device at which information is stored, wherein the information is accessed via a communication line between the computer device and the second computer device,
wherein mapping data is stored within said smart card memory, said mapping data defining, in relation to each indicium, a bounding box delineating a mapped position of said indicium on the smart card, and wherein generation of touch coordinates falling within said bounding box establishes selection of said indicium.

19. A computer device according to claim 18, wherein the information is an application that is located on said second computer device.

20. A computer device according to claim 18, wherein the information is accessed via the communication line when a user selects an indicium on the card.

21. A computer device according to claim 18, wherein the access is carried out by sending a command from the card reader to the second computer device via the computer device.

22. A computer device according to claim 21, wherein the command is associated with an indicium on the card which is selected by a user and stored in a memory of the card.

23. A computer device according to claim 18, wherein the information is loaded from the second computer device to said computer device.

24. A computer device that communicates with a second computer device via a communication line, and the second computer device communicates with a card reader comprising a touch sensitive membrane arranged to overlay an inserted smart card and through which indicia on a surface of the inserted smart card are visible, the membrane being responsive to a touch applied anywhere on the membrane, said membrane providing, in response to said touch, touch coordinates corresponding to a location of the touch on the membrane, the indicia being arranged on the card independently of where the touch can be applied to the membrane, said computer device comprising:

a processor for receiving a command from the card reader that receives the card that stores said command and an address that is pointing to a remote location at which information is stored, wherein the information is accessed via the communication line between the computer device and the second computer device, wherein mapping data is stored within the card memory, said mapping data defining, in relation to each indicium, a bounding box delineating a mapped position of said indicium on the card, and wherein generation of touch coordinates falling within said bounding box establishes selection of said indicium.

25. A computer device according to claim 24, wherein the information is an application that is located on the second computer device.

26. A computer device according to claim 24, wherein the information is accessed via the communication line when a user selects an indicium on the card.

27. A computer device according to claim 24, wherein the access is carried out by sending the command from said card reader to said computer device via the second computer device.

28. A computer device according to claim 27, wherein the command is associated with an indicium on the card that is selected by a user and stored in a memory of the card.

29. A smart card according to claim 24, wherein the information is loaded from said computer device to the second computer device.

30. A card reader for a card, the card being configured for insertion into said card reader, said card reader comprising:

a touch sensitive membrane arranged to overlay an inserted said card and through which indicia on a surface of the inserted card are visible, the membrane being responsive to a touch applied anywhere on the membrane, said membrane providing, in response to said touch, touch coordinates corresponding to a location of the touch on the membrane, the indicia being arranged on the card independently of where the touch can be applied to the membrane; and a processor for retrieving from a memory of the card an address that is pointing to a remote location in a second computer device at which information is stored and sending a command that is stored in the memory to the second computer device via a first computer device, wherein the information is accessed via a communication line between the first computer device and the second computer device, wherein mapping data is stored within said smart card memory, said mapping data defining, in relation to each indicium, a bounding box delineating a mapped position of said indicium on the smart card, and wherein generation of touch coordinates falling within said bounding box establishes selection of said indicium.

31. A card reader according to claim 30, wherein the information is an application that is located on the second computer device.

32. A card reader according to claim 30, wherein the information is accessed via the communication line when a user selects an indicium on the card.

33. A card reader according to claim 30, wherein the access is carried out by sending a command from the card reader to the second computer device via the computer device.

34. A card reader according to claim 33, wherein the command is associated with an indicium on the card which is selected by a user and stored in the memory of the card, and is read by said card reader.

35. A card reader according to claim 30, wherein the information is loaded from the second computer device to the first computer device.

36. A computer program to be executed in a computer device for communicating with a card reader comprising a touch sensitive membrane arranged to overlay an inserted card and through which indicia on a surface of the inserted card are visible, the membrane being responsive to a touch applied anywhere on the membrane, said membrane providing, in response to said touch, touch coordinates corresponding to a location of the touch on the membrane, the indicia being arranged on the card independently of where the touch can be applied to the membrane to select the indicia, said computer program comprising:

code to receive a command from said card reader that receives said card that stores said command and an address that is pointing to a remote location in another computer device at which information is stored, wherein the information is accessed via a communication line between the computer device and the other computer device, wherein mapping data is stored within said smart card memory, said mapping data defining, in relation to each indicium, a bounding box delineating a mapped position of said indicium on the smart card, and wherein generation of touch coordinates falling within said bounding box establishes selection of said indicium.

37. A computer program to be executed in a computer device that communicates for a second computer device via a communication line, the second computer device communicates with a card reader comprising a touch sensitive membrane arranged to overlay an inserted card and through which indicia on a surface of the inserted card are visible, the membrane being responsive to a touch applied anywhere on the membrane, said membrane providing, in response to said touch, touch coordinates corresponding to a location of the touch on the membrane, the indicia being arranged on the card independently of where the touch can be applied to the membrane to select the indicia, said computer program comprising;

code to receive a command from the card reader that receives said card that stores said command and an address that is pointing to a remote location in the computer device at which information is stored, wherein the information is accessed via the communication line between the computer device and the second computer device, wherein mapping data is stored within said smart card memory, said mapping data defining, in relation to each indicium, an a bounding box delineating a mapped position of said indicium on the smart card, and wherein generation of touch coordinates falling within said bounding box establishes selection of said indicium.

* * * * *

UNITED STATES PATENT AND TRADEMARK OFFICE
CERTIFICATE OF CORRECTION

PATENT NO. : 6,871,782 B2
DATED : March 29, 2005
INVENTOR(S) : Seppo Reino Keronen et al.

It is certified that error appears in the above-identified patent and that said Letters Patent is hereby corrected as shown below:

Title page,
Item [56], References Cited, FOREIGN PATENT DOCUMENTS, insert
-- EP    469581        2/1992 -- ; and
"JP    123986        7/1984" should be deleted.
OTHER PUBLICATIONS,
" "IntelliK ys, Effectiv , Powerful, and Affordabl ," product informati n, http://www.intellitools.c m/intellik ys-text.h-tml, no date available." should read
-- "IntelliKeys, Effective, Powerful, and Affordable," product information, http://www.intellitools.com/intellikeys-text.html, no date available. --.

Column 2,
Line 17, "comprising;" should read -- comprising: --.

Column 4,
Line 6, "thereof" should read -- thereof. --.

Column 5,
Line 27, "shown A" should read -- shown. A --.

Column 6,
Line 12, "39 20" should read -- 39 --.

Column 7,
Line 53, "selecting" should read -- selection of --; and
Line 62, "at" should read -- at a --.

Column 8,
Line 2, "same" should read -- frame --;
Line 11, "table" should read -- table of --;
Line 27, "FIG. 41 is" should read -- FIG. 41 is a --; and "of" should read -- of a --;
Line 53, "A processor" should read -- a processor --;
Line 54, "that" should read -- that the --;
Lines 56 and 57, "such like" should read -- such as --; and
Line 66, "with" should read -- which --.

Column 9,
Line 7, "that" should read -- that the --.

Column 10,
Line 41, "shape" should read -- shape. --.

UNITED STATES PATENT AND TRADEMARK OFFICE
CERTIFICATE OF CORRECTION

PATENT NO. : 6,871,782 B2
DATED : March 29, 2005
INVENTOR(S) : Seppo Reino Keronen et al.

It is certified that error appears in the above-identified patent and that said Letters Patent is hereby corrected as shown below:

Column 12,
Line 40, "movement," should read -- movement. --.

Column 13,
Line 13, "In" should read -- in --; and
Line 35, "reference s" should read -- references --.

Column 14,
Line 56, "address" " should read -- address". --.

Column 15,
Line 6, "number," should read -- numbers, --;
Line 63, "application," should read -- application. --;
Line 64, "where the programmer is able to select appropriate graphics" should be deleted; and
Line 65, "from the software application" should be deleted.

Column 16,
Line 8, "image" should read -- imagine --.

Column 17,
Line 50, "illuminate," should read -- illuminated, --.

Column 18,
Line 54, "FIG. 3))" should read -- FIG. 3) --.

Column 19,
Line 67, "is" should be deleted.

Column 20,
Line 11, "and be" should read -- and can be --; and
Line 43, "user. the" should read -- user. The --.

Column 21,
Line 22, "210," should read -- 210. --;
Line 28, "compute" should read -- computer --; and
Line 37, "invention," should read -- invention. --.

UNITED STATES PATENT AND TRADEMARK OFFICE
CERTIFICATE OF CORRECTION

PATENT NO. : 6,871,782 B2
DATED : March 29, 2005
INVENTOR(S) : Seppo Reino Keronen et al.

It is certified that error appears in the above-identified patent and that said Letters Patent is hereby corrected as shown below:

Column 22,
Line 51, "device" should read -- device, --;
Line 55, "substrate the" should read -- substrate, the --; and
Line 59, "device said" should read -- device, said --.

Column 23,
Line 14, "card the" should read -- card, the --;
Line 31, "reader" should read -- read --; and
Line 39, "customizable user interface system" should read -- read device --.

Column 25,
Line 30, "smart card" should read -- computer device --.

Column 26,
Line 58, "an" should be deleted.

Signed and Sealed this

Eighteenth Day of October, 2005

JON W. DUDAS
*Director of the United States Patent and Trademark Office*